United States Patent [19]
Lee et al.

[11] Patent Number: 5,089,970
[45] Date of Patent: Feb. 18, 1992

[54] INTEGRATED MANUFACTURING SYSTEM

[75] Inventors: Mark S. Lee, Windsor Locks, Conn.; Cameron M. McQuaid, Middlefield, Mass.; Stephen R. Urban, West Hartford, Conn.; Donald A. Seccombe, Jr., Cheshire, Conn.; Robert T. Leo, Jr., Manchester, Conn.; Edward H. Coon, Winfield, Pa.; Olin H. Bray, Albuquerque, N.H.

[73] Assignee: Combustion Engineering, Inc., Windsor, Conn.

[21] Appl. No.: 417,626

[22] Filed: Oct. 5, 1989

[51] Int. Cl.⁵ .................. G06F 15/46; G06F 15/16
[52] U.S. Cl. ................................. 364/468; 364/131
[58] Field of Search ............ 364/468, 478, 131–135, 364/401–403, 481

[56] References Cited

U.S. PATENT DOCUMENTS

| | | | |
|---|---|---|---|
| 4,604,718 | 8/1986 | Norman et al. | 364/578 |
| 4,796,194 | 1/1989 | Atherton | 364/468 |
| 4,827,423 | 5/1989 | Beasley et al. | 364/468 |
| 4,875,162 | 10/1989 | Ferriter et al. | 364/401 |

Primary Examiner—Jerry Smith
Assistant Examiner—Brown, Thomas E.
Attorney, Agent, or Firm—Arthur E. Fournier, Jr.

[57] ABSTRACT

An integrated manufacturing system operative for managing the distribution to a factory floor as well as throughout a factory of the information that is necessary to effectuate the production of products on the factory floor. The information required for this purpose encompasses, but is not necessarily limited to, both the design information which is generated within the engineering enterprise and the scheduling information which is generated within the manufacturing resource planning system. This information consisting of design and manufacturing data pertaining to the product to be produced is in turn stored in a central repository for all shared information from whence as needed it is capable of being distributed in a logical and efficient fashion through operation of the integrated manufacturing system to the factory floor as well as throughout the factory so as to thereby enable the product to be produced on the factory floor in a most timely and most cost-effective manner.

4 Claims, 28 Drawing Sheets

INTEGRATED MANUFACTURING SYSTEM

BACKGROUND OF THE INVENTION

This invention relates to the production of products, and more specifically, to an integrated manufacturing system for managing the distribution to a factory floor and throughout a factory of the information that is necessary to effectuate the production of products on the factory floor.

It has long been known to manufacture products in factories. Moreover, it has long been known that one of the primary factors to which consideration normally is most often given before commencing the construction of a new manufacturing facility and/or the refurbishing of an old one is the nature of the product which will be manufactured therein. Also, the fact that particular types of facilities are better suited for the manufacture of certain kinds of products than are others is well accepted. Finally, it has long been known that the configuration of the exterior and the interior of a manufacturing facility as well as the manner in which the production equipment is arranged within the facility are predicated, in large measure if not entirely, upon the nature of the steps which are required to be performed in order to effect the successful manufacture of the given product in the particular facility.

Continuing, factories built prior to World War II commonly were built in the form of multistory buildings. Moreover, in accord with the design and use of such multistory buildings as factories, the heaviest of the manufacturing equipment normally was located in the basement and/or first floor of the multistory factory building. The upper floors of the multistory factory building were thus left free to be used for purposes of receiving the lighter manufacturing equipment thereat and/or to permit assembly-type operations to be conducted thereat. As a consequence of the manufacturing equipment being laid out in the aforedescribed fashion in such multistory factory buildings, the materials from which the products were being fabricated, as these materials progressed through the various stages of manufacturing culminating in the completed production of the products, were customarily required to be moved about within the multistory factory building, i.e., from one portion of one floor thereof to another portion of the same floor thereof and/or from one floor thereof to another floor thereof. With the materials having to be moved about within the multistory factory building, this resulted in valuable manufacturing time being lost since obviously while the materials were in transit between one point and another within the multistory factory building there was no manufacturing operation being performed thereon.

However, following World War II as new factories were being built it became more and more common to find such new factories being built in the form of single story buildings, i.e., being built so as to be all on one level. Moreover, by the middle of the 1950's not only were factories being built so that they were all of one level but also so that they were laid out in a particular fashion. Namely, in terms of layout such factories were being made to embody a layout wherein the raw materials from which the products were to be manufactured were made to enter the factory building at one end thereof. Then, while in the process of traversing the interior of the factory building these raw materials progressively were subjected to successive operations of the manufacturing process such that by the time they reached the other end of the building they had been transformed into finished products. As finished products, they were then shipped out of the factory building from this other end thereof. One of the benefits that was derived from the use of such a layout was that it enabled a reduction to be had in the amount of production time lost due to materials having to be moved from one area to another within the factory building which had served to disadvantageously characterize the use of multistory buildings for manufacturing purposes.

The focus in the 1960's and 1970's, insofar as factories and the manufacturing operations conducted therewithin are concerned, shifted from one of plant construction and layout to one largely of looking at ways of achieving a more effective and efficient utilization of the manufacturing equipment being employed in the factory building. In one way or another much of this effort was centered on realizing a reduction in the extent to which a human was required to be involved in the actual operation of the manufacturing equipment. Said another way, much of this effort in one way or another was centered on ways in which it might be possible to automate more and more of the manufacturing equipment's operation. One outgrowth undoubtedly attributable to this effort was the fact that numerically controlled (NC) machines began to be seen in increasing numbers within factory buildings.

The period following this, up to and including the present, has been characterized by and large by the fact that more and more attention has been devoted to finding ways in which more and more use can be made of computers in connection with manufacturing operations. By way of exemplification and not limitation in this connection, reference is had here in particular to the development during this period of what have come to be referred to as computer-aided design (CAD) systems and computer-aided manufacturing (CAM) systems. Very broadly stated, one might say that the difference between a CAD system and a CAM system resides primarily in the fact that as may be derived from the name applied thereto a CAD system is a system wherein the use which is made of the computer in such a system is related to the design of a product, whereas a CAM system is a system wherein the use which is made of the computer in such a system is related to the manufacture of a product.

To thus summarize the preceding discussion herein, it is well accepted by virtually all that a number of significant changes have occurred over the past 40 years or so both in the manner in which factory buildings are constructed and the interior thereof is laid out, and in the manner in which manufacturing operations are conducted therewithin. For instance, it is known that in the era of multistory factory buildings notwithstanding how effectively and efficiently each of the individual operations which collectively combine to make up the total manufacturing process for a given product may have been made to be, manufacturing conducted in multistory factory buildings was nevertheless characterized by the fact that it was inherently inefficient, i.e., was not as efficient as it might otherwise have been. Reference is had in this connection to the fact that a multistory factory building by its very nature customarily gave rise to a requirement that the materials from which the products were being fabricated, as these materials progressed through the various stages of manufacturing culminating in the completed production of the products, needed to be moved about within the multistory factory building, i.e., from one portion of one floor thereof to another portion of the same floor thereof and/or from one floor thereof to another floor thereof. This requirement that the materials be moved about within the multistory factory building resulted in valuable manufacturing time being lost since obviously while the materials were in transit from one point to another within the multistory factory building there were no manufacturing operations being performed thereon.

In an effort to overcome the inefficiencies in the manufacturing process occasioned by the use of multistory factory buildings wherein materials were required to be moved from one location to another therewithin in order to enable manufacturing operations to be performed thereon thereby giving rise to lost manufacturing time while the materials were in transit, factory buildings as discussed hereinbefore began to be built all on one level, i.e., in the form of single story factory buildings. Furthermore, the movement towards replacing multistory factory buildings with single story factory buildings was then followed by a movement towards laying out the interior of the single story factory building in such a manner that the raw materials from which the products were to be manufactured were made to enter the factory building at one end thereof whereupon while in the process of traversing the interior of the single story factory building from one end to the other thereof, these raw materials progressively were subjected to successive operations in the manufacturing process such that by the time they reached the other end of the single story factory building they had been transformed into finished products and it was from this other end of the single story factory building from whence as finished products they were then shipped. By employing such a layout of the single story factory building, it was thus possible to realize therefrom a reduction in the amount of manufacturing time which was lost due to the need to move materials around from one location to another within the factory building for purposes of enabling manufacturing operations to be conducted thereupon as compared to the amount of production time which was lost due to materials having to be moved from location to location within a multistory factory building for purposes of enabling manufacturing operations to be performed thereon.

Thereafter, the focus of attention appeared to shift from one which was centered on how factory buildings were being constructed and/or how the interior thereof was being laid out to one which was centered on finding ways that would enable manufacturing equipment to be employed more effectively and more efficiently. This change in the focus of attention undoubtedly contributed in large part to the increasing frequency with which one found NC machines being employed in factory buildings and to the development of what are known today as CAD systems and CAM systems.

Once again, however, we have reached a point in time wherein notwithstanding how effectively and efficiently through the use of NC machines and/or CAD systems and/or CAM systems, etc. it may now be possible to perform each of the individual manufacturing operations which collectively combine to encompass the entire manufacturing process for a given product, time which could otherwise be better spent in the productive performance of manufacturing operations is now being lost unnecessarily just as was the case in the 1940's in the days when multistory buildings were being utilized as factories. However, unlike in the days of multistory factory buildings wherein valuable manufacturing time was being lost by virtue of the need to move the raw materials which were used in the manufacture of products extensively about from one location to another within the multistory factory building in order to enable the requisite manufacturing operations to be performed thereon, today the loss in valuable manufacturing time can be attributed not to the need to extensively move raw materials around but to the need to extensively move information around. The information to which reference is had here is the design and manufacturing data that is required for purposes of effectuating the manufacture on the factory floor of products. Today's loss of valuable manufacturing time can occasion a number of problems in the manufacturing process. Moreover, these problems may manifest themselves in a number of ways. In this regard, by way of exemplification and not limitation, there can be the problem of late delivery or missed schedules, and/or the problem of nonconforming products attributable to poor quality or the use of out-of-date data, and/or the problem of high rework and scrap levels, and/or the problem of few inventory turnovers, and/or the problem of an information poor environment wherein there is no movement of data and/or the wrong data is moved and/or the movement of data is not timely, and/or the problem of no or inadequate feedback in the status of operations within the factory, and/or the problem of no or inadequate feedback in the manufacturing capability of the equipment being employed in the factory, etc.

A need has thus been evidenced in the prior art for a new and improved system suitable for use for purposes of managing the distribution to a factory floor and throughout a factory of the information, particularly as it relates to design and manufacturing data, which is necessary to effectuate the production of products on the factory floor. More specifically, a need has thus been evidenced for such a system, which is capable of distributing in a logical and efficient fashion to the factory floor as well as throughout the factory from a central repository for all shared information, information consisting of design and manufacturing data pertaining to the product to be produced so as to thereby enable the product to be produced on the factory floor in a most timely and most cost-effective manner. Moreover, desirably such a system should encompass, but not necessarily be limited to, the central repository for all shared information, the engineering enterprise wherein the design information pertaining to the production of the product is generated, and the manufacturing resource planning system wherein the scheduling information pertaining to the flow through the factory of materials culminating in the production of the finished product is generated.

It is, therefore, an object of the present invention to provide a new and improved integrated system suitable for use for managing the distribution to a factory floor and throughout a factory of information required for the manufacture of products.

It is another object of the present invention to provide such an integrated manufacturing system for distributing to the factory floor and throughout the factory information in the form of design and manufacturing data that is necessary for the production of products on the factory floor.

It is still another object of the present invention to provide such an integrated manufacturing system which is characterized in that it encompasses a central repository for all shared information wherein is stored the information that is distributed to the factory floor and throughout the factory.

A further object of the present invention is to provide such an integrated manufacturing system which is characterized in that it encompasses an engineering enterprise wherein the design information pertaining to the production of the product which is distributed to the factory floor and throughout the factory is generated.

A still further object of the present invention is to provide such an integrated manufacturing system which is characterized in that it encompasses a manufacturing resource planning system wherein the scheduling information pertaining to the flow through the factory of materials culminating in the production of the finished product which is distributed to the factory floor and throughout the factory is generated.

Yet another object of the present invention is to provide such an integrated manufacturing system which is characterized in that it is capable of being used in a new factory building.

Yet still another object of the present invention is to provide such an integrated manufacturing system which is characterized in that it is capable of being retrofitted into an existing factory building.

SUMMARY OF THE INVENTION

In accordance with the present invention there is provided a new and improved system in the nature of an integrated management system suitable for use for the purposes of managing the distribution to a factory floor as well as the distribution throughout a factory of the information which is required to effectuate the manufacture of products on the factory floor. The subject integrated management system comprises product information entry means, configuration management means, manufacturing resource planning means and factory floor means. In addition, the subject integrated management system may further include other design/manufacturing information source means. The product information entry means is designed so as to be operative to generate from specifications, which are furnished by the customer with regard to the products that are to be manufactured, certain forms of information which are required for purposes of effectuating the manufacture of products on the factory floor. As such, the product information entry means functions as the source of product specific information such as, by way of exemplification and not necessarily limitation, information of a design/drawing nature, of a process planning nature, of a bill of materials nature and of an estimated cost nature. The configuration management means functions as the central repository for all of the shared information that is required for purposes of effectuating the manufacture of products on the factory floor. To this end, the configuration management means functions as the source of information such as, by way of exemplification and not necessarily limitation, information of an engineering/manufacturing control change nature, of an overall facility information control nature and of a product description, i.e., bill of information, nature. The manufacturing resource planning means functions as the source of information of a scheduling nature that is required for purposes of effectuating the manufacture of products on the factory floor. In this regard, the manufacturing resource planning means functions as the source of information such as, by way of exemplification and not necessarily limitation, information of a scheduling nature, of a purchase order/work order nature and of an inventory control nature. The factory floor means functions as the source of information relating to the operations which take place on the factory floor during the course of effectuating thereat the manufacture of products. Thus, the factory floor means functions as the source of information such as, by way of exemplification and not necessarily limitation, information of a work center load nature, of a general work center operations nature, of a manufacturing method nature, of a data collection nature, of a direct numerical control (DNC) nature, of a quality feedback nature, of a maintenance nature and of a tooling/fixturing status nature. When the subject integrated manufacturing system also includes other design/manufacturing information source means, this other design/manufacturing information source means functions in the nature of an additional source of design information and/or manufacturing information. More specifically, by way of exemplification and not necessarily limitation, the other design/manufacturing information source means functions as a source of information such as information of a detail drafting nature and of a numerical control (N/C) programming nature.

DESCRIPTION OF A PREFERRED EMBODIMENT

Figure 1:
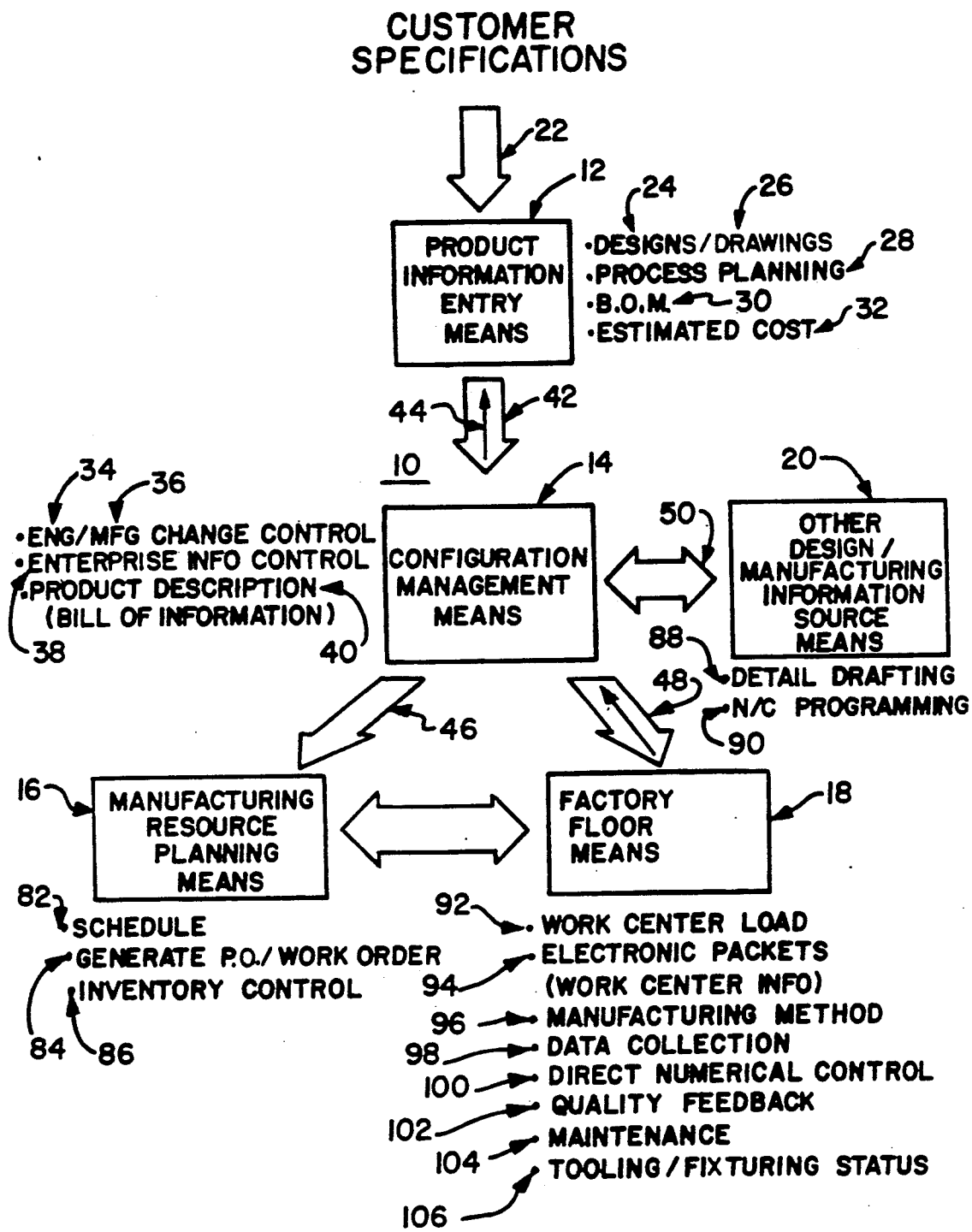
FIG. 1 is a schematic representation in block diagram form of an integrated manufacturing system constructed in accordance with the present invention.

Referring now to the drawing, and more particularly to FIG. 1 thereof, there is depicted therein in block diagram form an integrated manufacturing system, generally designated by the reference numeral 10, constructed in accordance with the present invention. The integrated manufacturing system 10 is operative for the purposes of managing the distribution to a factory floor as well as the distribution throughout a factory of the information which is required to effectuate the manufacture of products on the factory floor. As best understood with reference to FIG. 1, the integrated manufacturing system 10 comprises suitably connected in operative relation one to another, as will be more fully described hereinafter, product information entry means, generally designated in FIG. 1 by the reference numeral 12; configuration management means, generally designated in FIG. 1 by the reference numeral 14; manufacture resource planning means, generally designated in FIG. 1 by the reference numeral 16; factory floor means, generally designated in FIG. 1 by the reference numeral 18; and other design/manufacturing information source means, generally designated in FIG. 1 by the reference numeral 20.

For purposes of setting forth a description of the nature of the construction and the mode of operation of the integrated manufacturing system 10 to which the present invention is directed, the integrated manufacturing system 10 will not be described in the context of its utilization for purposes of effectuating the manufacture on the factory floor of any particular type of product. Rather, insofar as the description that follows of the integrated manufacturing system 10 is concerned, it will be assumed that the integrated manufacturing system 10 is suitable for use for purposes of effectuating the manufacture on the factory floor of any given type of product. Further to this point, although the integrated manufacturing system 10 is capable of being utilized in connection with the manufacture of products that are produced by means of a continuous manufacturing process as contrasted to a discrete manufacturing process, the integrated manufacturing system 10 is deemed to be more suitable for use in connection with the manufacture of products that are produced by a discrete manufacturing process.

With the preceding by way of background, a description will now be had, with particular reference being given to FIG. 1 of the drawing, of the integrated manufacturing system 10 which forms the subject matter of the present invention. As noted above previously, the description of the nature of the construction and the mode of operation of the integrated manufacturing system 10 will be had herein in the context of the manner in which the integrated manufacturing system 10 is employed in order to effectuate the manufacture on a factory floor of any type of product, but with most attention being directed herein to products that are produced by means of discrete manufacturing processes.

Reference will be had first to the product information entry means 12. The product information entry means 12 is designed so as to be operative to generate certain forms of product specific information which are required for purposes of effectuating the manufacture of products on the factory floor. These certain forms of product specific information are generated in response to input, the latter being depicted schematically in FIG. 1 of the drawing wherein this input is denoted by the reference numeral 22, in the form of the specifications which have been furnished by the customer with respect to the particular product that the customer seeks to have manufactured on the factory floor and which will be manufactured on the factory floor utilizing information distributed to the factory floor as well as throughout the factory in accordance with the mode of operation of the integrated manufacturing system 10 which forms the subject matter of the present invention. As used herein, the term "customer" is being used in its broadest sense; namely, as simply a means of designating the party for whom the product is being manufactured.

Continuing, the product information entry means 12 in accordance with the best mode embodiment of the present invention has various forms of data housed therewithin. More specifically, housed within the product information entry means 12 in accord with the best mode embodiment of the present invention is information, i.e., data, in the form of the designs for the particular types of products which it is contemplated would be manufactured on the factory floor, such information, i.e., data, being denoted at 24 in FIG. 1 of the drawing. Secondly, in accord with the best mode embodiment of the present invention there is housed within the product information entry means 12 information, i.e., data, in the form of the drawings for the particular types of products which it is contemplated would be manufactured on the factory floor, such information, i.e., data, being denoted at 26 in FIG. 1 of the drawing. Thirdly, housed within the product information entry means 12 in accord with the best mode embodiment of the present invention is process planning information, i.e., data relating to the various process steps that would be required for purposes of effectuating the manufacture on the factory floor of the particular types of products which it is contemplated would be manufactured thereat, such information, i.e., data, being denoted at 28 in FIG. 1 of the drawing. Fourthly, in accord with the best mode embodiment of the present invention there is housed within the product information entry means 12 information, i.e., data, in the form of the bills of materials for the particular types of products which it is contemplated would be manufactured on the factory floor, such information, i.e., data, being denoted at 30 in FIG. 1 of the drawing. Fifthly, in accordance with the best mode embodiment of the present invention the product information entry means 12 has housed therewithin information, i.e., data, in the form of the estimated costs for manufacturing the particular types of products which it is contemplated would be manufactured on the factory floor, such information, i.e., data, being denoted at 32 in FIG. 1 of the drawing. Although the product information entry means 12 has been depicted in FIG. 1 and has been described hereinbefore as having housed therewithin various particular forms of data, i.e., the forms of information denoted in FIG. 1 of the drawing by the reference numerals 24, 26, 28, 30 and 32, it is to be understood that the product information entry means 12 may equally well without departing from the essence of the present invention have housed therewithin a greater or a lesser number of forms of information, as established in particular by a consideration of the nature of the information, which the integrated manufacturing system 10 is required to manage the distribution of to the factory floor as well as throughout the factory.

Consideration will next be given to the configuration management means 14. The configuration management means 14 is designed to function as the central repository for all of the shared information that is required for purposes of effectuating the manufacture of products on the factory floor. To this end, the configuration management means 14 functions as the source of various forms of information, i.e., data. More specifically, in accord with the best mode embodiment of the present invention the configuration management means 14 functions as the source of information, i.e., data, of an engineering control change nature, such information, i.e., data, being denoted at 34 in FIG. 1. Secondly, the configuration management means 14 in accord with the best mode embodiment of the present invention functions as the source of information, i.e., data, of a management control change nature, such information, i.e., data, being denoted at 36 in FIG. 1. Thirdly, in accord with the best mode embodiment of the present invention the configuration management means 14 functions as the source of information, i.e., data, of an overall facility information control nature, such information, i.e., data, being denoted at 38 in FIG. 1. Fourthly, the configuration management means 14 in accord with the best mode embodiment of the present invention functions as the source of information, i.e., data, of a product description, i.e., bill of information, nature, such information, i.e., data, being denoted at 40 in FIG. 1. Although the configuration management means 14 has been depicted in FIG. 1 and has been described hereinbefore as being the source of various particular forms of data, i.e., the forms of information denoted in FIG. 1 by the reference numerals 34, 36, 38 and 40, it is to be understood that the configuration management means 14 may equally well without departing from the essence of the present invention serve as the source of a greater or a lesser number of forms of information, as established in particular by a consideration of the nature of the information, which the integrated manufacturing system 10 is required to manage the distribution of to the factory floor as well as throughout the factory.

Figure 2:
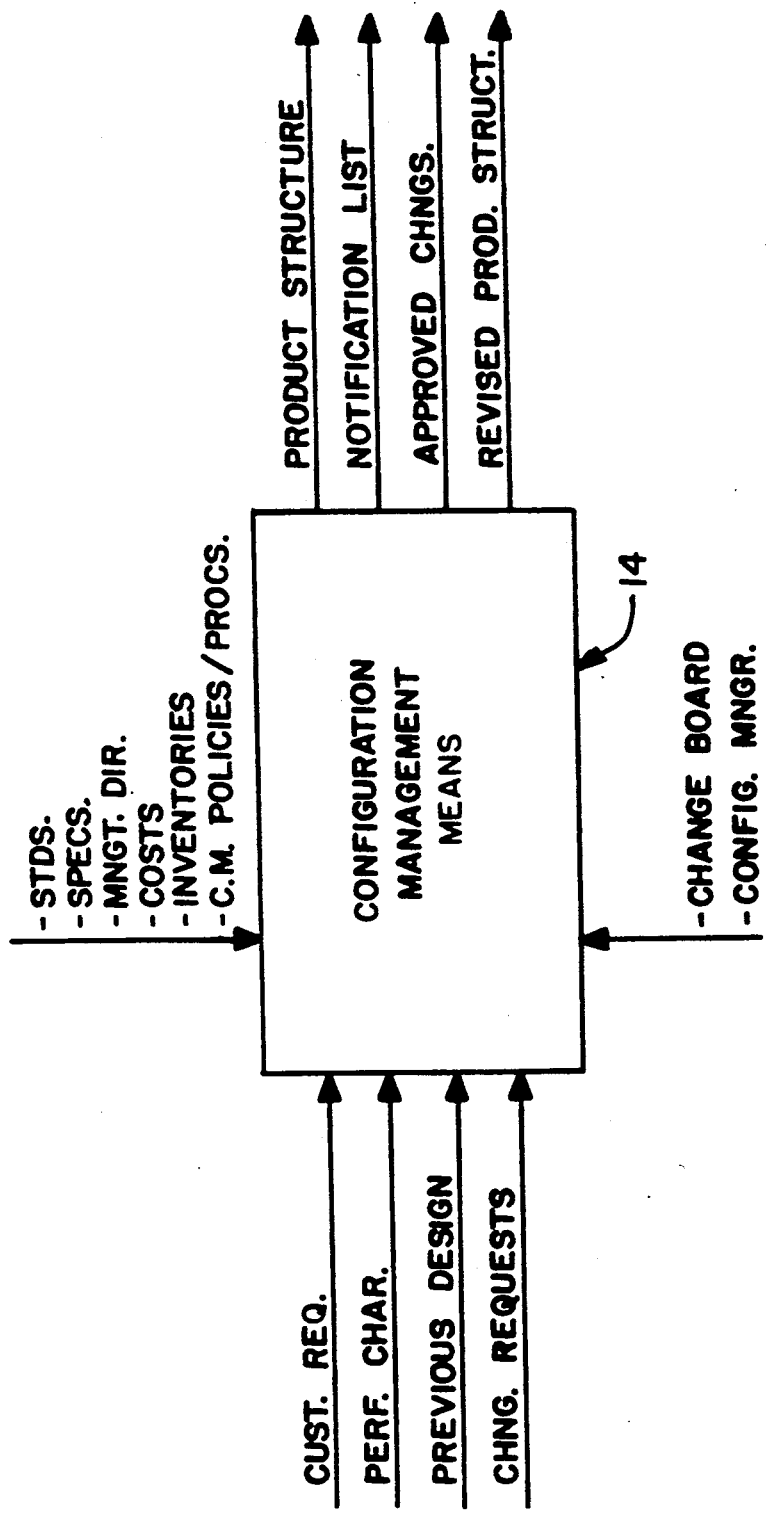
FIG. 2 is a schematic representation in block diagram form of the configuration management means of an integrated manufacturing system constructed in accordance with the present invention.
Figure 3:
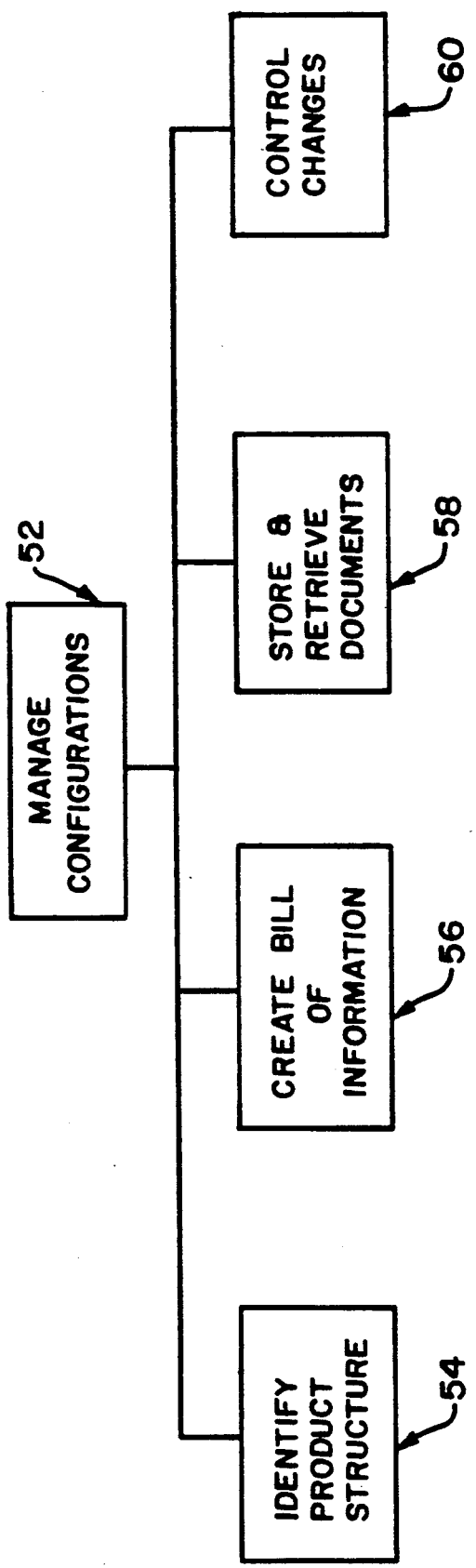
FIG. 3 is a schematic representation in block diagram form of the four subfunctions which are encompassed within the manage configuration function that is performed by the configuration management means of an integrated manufacturing system constructed in accordance with the present invention.
Figure 4:
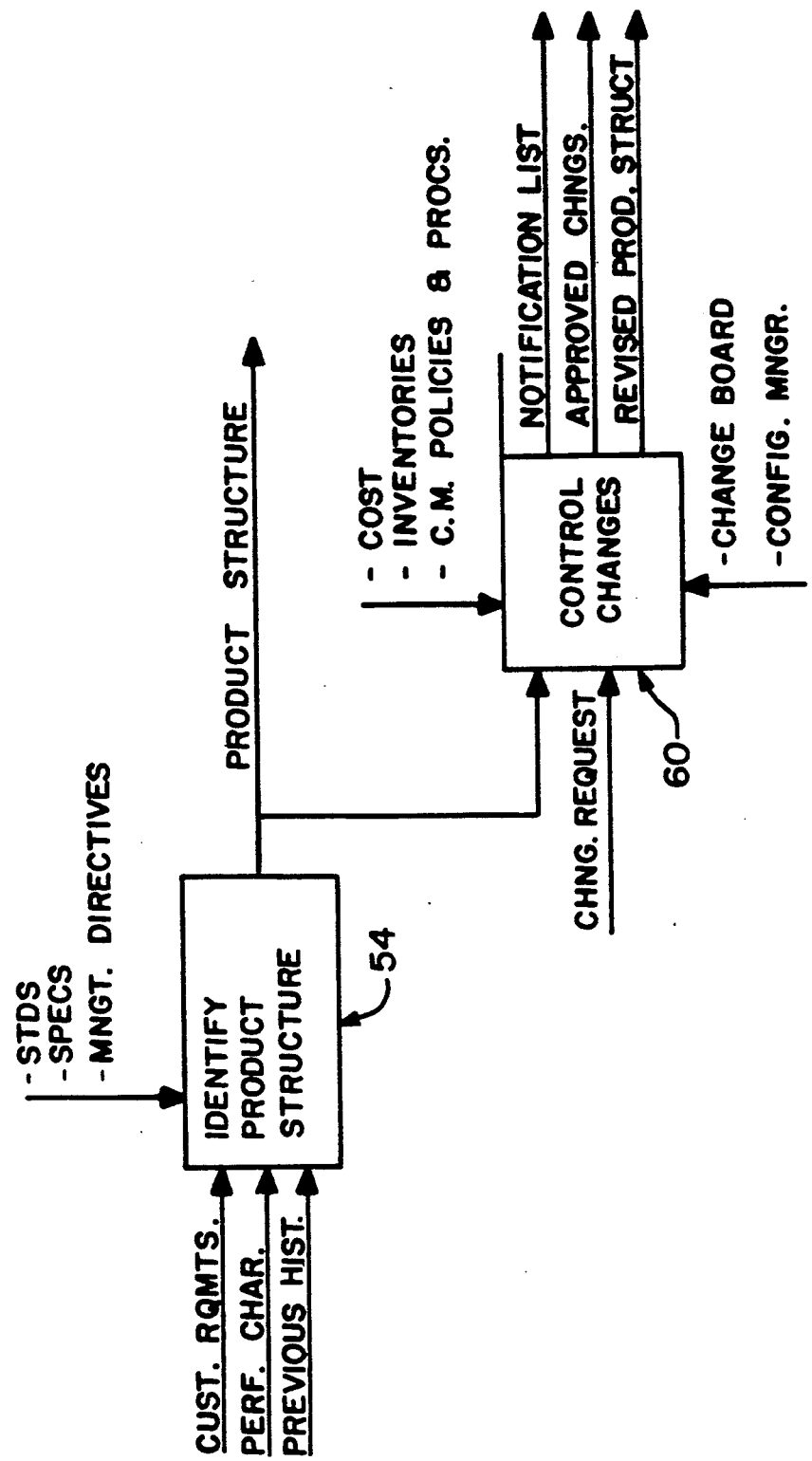
FIG. 4 is a schematic representation in block diagram form of the information flow between the four subfunctions illustrated in FIG. 3 of the manage configuration function of the configuration management means of an integrated manufacturing system constructed in accordance with the present invention.

With further regard thereto, the configuration management means 14 fulfills a number of different roles. A more detailed description of these different roles will now be had herein. For purposes of this description, reference will be had in particular to FIGS. 2, 3, 4 and 5 of the drawing with some occasional reference also being had to FIG. 1 of the drawing. As best understood with reference to FIG. 2, the top level summary role of the configuration management means 14 is, as the name given thereto implies, to manage configurations. To this end, as denoted by the arrow identified in FIG. 1 by the reference numeral 42, inputs are received by the configuration management means 14 from the product information entry means 12. Numbered among these inputs which are communicated in electronic form from the product information entry means 12 to the configuration management means 14 through the use of any conventional form of electronics means suitable for use for this purpose are a multiplicity of inputs each of which serves to convey from the product information entry means 12 to the configuration management means 14 a different type of product specific information relating to the product that the customer desires to have manufactured on the factory floor. More specifically, the product specific information provided by virtue of these inputs encompasses things such as customer product requirements, product performance requirements, previous product designs and product documents, e.g., product drawings, and product change requests of an engineering and/or manufacturing nature.

In turn, in a manner to which further reference will be had hereinafter there are transmitted in electronic form through the use of any conventional form of electronics means suitable for use for this purpose outputs from the configuration management means 14 to each of the other means, i.e., the product information entry means 12, the manufacturing resource planning means 16, the factory floor means 18 and the other design-/manufacturing information source means 20, which when combined with the configuration management means 14 collectively comprise the best mode embodiment of the integrated manufacturing system 10 which forms the subject matter of the present invention. These outputs from the configuration management means 14 by means of which information is transmitted therefrom in electronic form to the product information entry means 12, to the manufacturing resources planning means 16, to the factory floor means 18 and to the other design/manufacturing information source means 20 are denoted by the arrows which are identified in FIG. 1 by the reference numerals 44, 46, 48 and 50, respectively. The nature of the information which is transmitted in electronic form, i.e., is transmitted via outputs 44,46,48 and 50 from configuration management means 14 to the product information entry means 12, to the manufacturing resource planning means 16, to the factory floor means 18 and to the other design/manufacturing information source means 20, respectively, includes information relating to product structures, product approved changes, revised product designs and product documents, e.g., product drawings, and product notification lists. Other information which passes in electronic form through the outputs 44, 46, 48 and 50 from the configuration management means 14 to the product information entry means 12, to the manufacturing resource planning means 16, to the factory floor means 18 and to the other design/manufacturing information source means 20, respectively, is information which is deemed to be of a control nature. The latter information, i.e., the information of a control nature, is deemed to include information such as information relating to engineering and manufacturing product standards, governmental and company policies and procedures relating to factory floor operations, product inventories, factory floor costs, etc.

Continuing with the description of the configuration management means 14, the manage configurations role, i.e., function, of the configuration management means 14 of the integrated manufacturing system 10 consists, in accordance with the best mode embodiment of the invention, of four subfunctions, i.e., subroles. These four subfunctions, as best understood with reference to FIG. 3 of the drawing, of the manage configurations function of the configuration management means 14 are, in accordance with the best mode embodiment of the invention, the following: identify product structure, identify/create the bill of information, store and retrieve documents, and control changes. For ease of reference thereto in FIG. 3 of the drawing, the manage configurations function is denoted therein generally by the reference numeral 52, the identify product structure subfunction is denoted therein generally by the reference numeral 54, the identify/create the bill of information subfunction is denoted therein generally by the reference numeral 56, the store and retrieve documents subfunction is denoted therein generally by the reference numeral 58 and the control changes subfunction is denoted therein generally by the reference numeral 60. The manner in which information is made to flow among these four subfunctions, i.e., among the identify product structure subfunction 54, the identify/create the bill of information subfunction 56, the store and retrieve documents subfunction 58, and the control changes subfunction 50, is best understood with reference to FIG. 4 of the drawing wherein there is to be found an illustration of this information flow among the subfunctions 54, 56, 58 and 60. It should be understood here that the flow of information among the subfunctions 54, 56, 58 and 60 takes place in an electronic form through the use of any conventional form of electronic means suitable for use for such a purpose.

Figure 5:
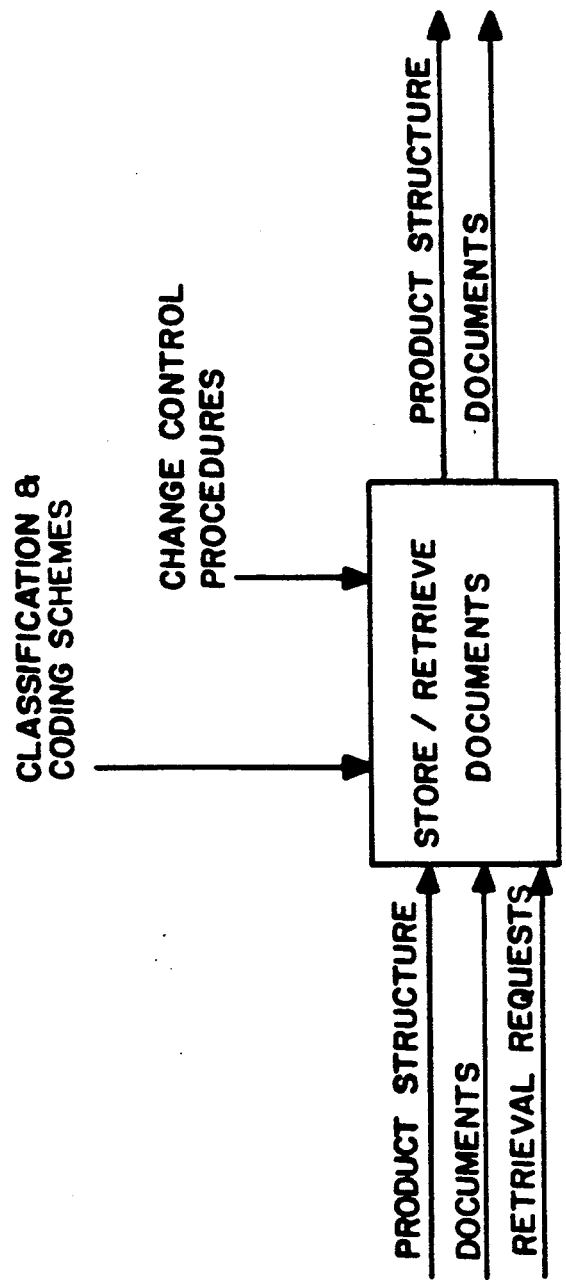
FIG. 5 is a schematic representation in block diagram form of the store and retrieve documents subfunction of the manage configuration function of the configuration management means of an integrated manufacturing system constructed in accordance with the present invention.
Figure 6:
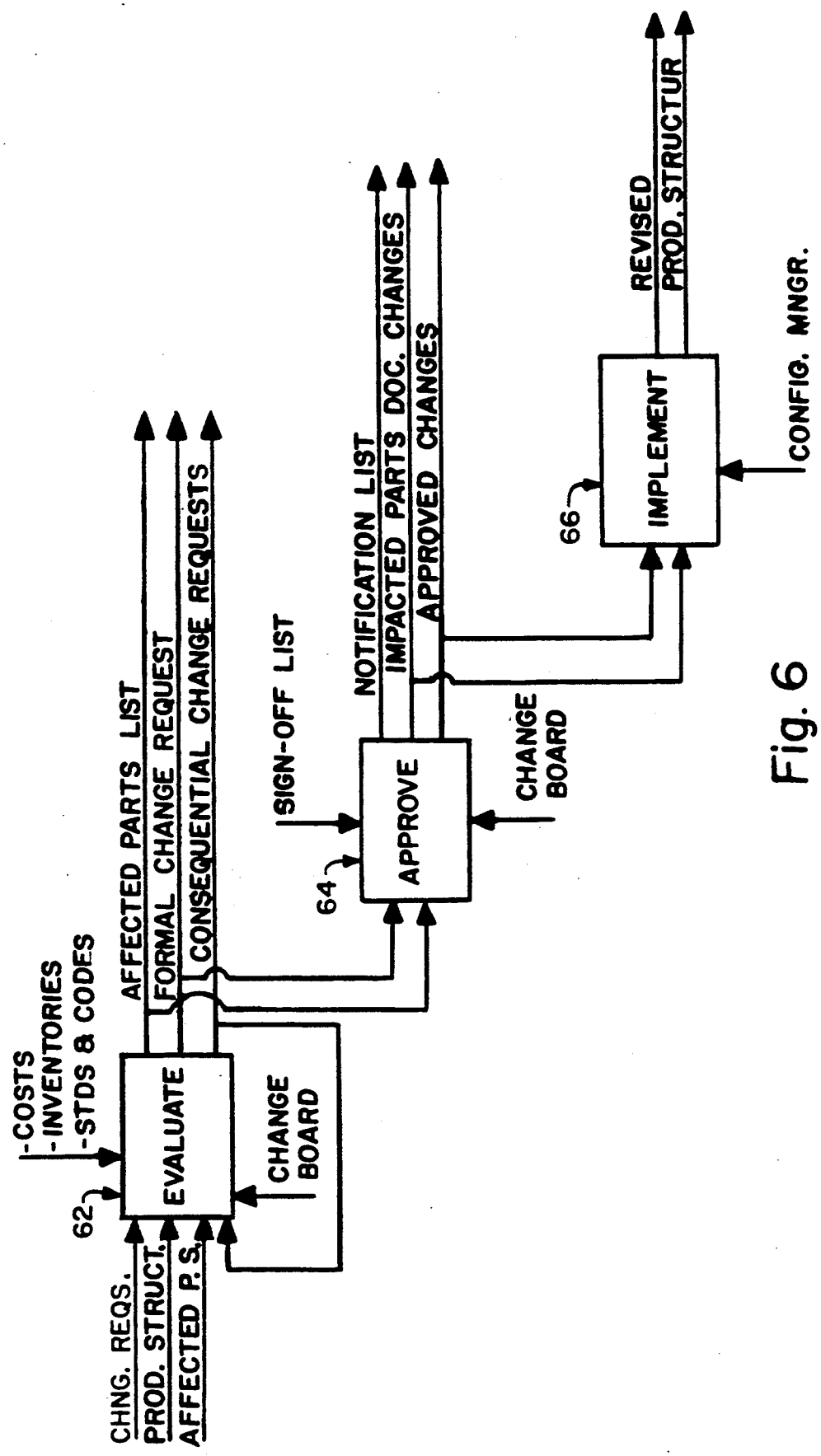
FIG. 6 is a schematic representation in block diagram form of the control changes subfunction of the manage configuration function of the configuration management means of an integrated manufacturing system constructed in accordance with the present invention.

The primary output in terms of subfunction from the manage configurations function 52 of the configuration management means 14 is the product structure subfunction 54. During the product design and product manufacturing process additional documents are created and related to the product structure subfunction 54 so as to create the bill of information subfunction 56. Next, there is the third subfunction, i.e., the store and retrieve documents subfunction 58 which as depicted in FIG. 5 of the drawing deals with the actual storage and retrieval of the various types of documents required for purposes of effectuating the manufacture of the product desired by the customer. Essentially this is a librarian and/or archive type function. Finally, there is the fourth subfunction, i.e., the control changes subfunction 60. The role of the control changes subfunction 60 is to exercise control over changes from both product engineering and product manufacturing which relate to the product that the customer desires to have manufactured on the factory floor. As best understood with reference to FIG. 6 of the drawing, the control changes subfunction 60 is capable of being further decomposed with respect to the aforereferenced changes into the functions of evaluating, of approving and of implementing changes. These functions of evaluating, of approving and of implementing changes are denoted by the reference numerals 62, 64 and 66, respectively, in FIG. 6 of the drawing.

In the way of a brief summarization of the preceding discussion concerning the configuration management means 14, the primary function which the configuration management means 14 is intended to perform is that of being a central repository of all shared product related design and product related manufacturing information, i.e., data, needed for purposes of effectuating the manufacture on the factory floor of the product that the customer desires. To this end, when certain common information, i.e., data, relating to the product that the customer desires to have manufactured on the factory floor is required, there is a need to be able to quickly identify which documents contain the desired information, i.e., data, and where copies of these documents are located. Identification of documents as well as of their location is had through the use of the directory function capability which the configuration management means 14 embodies. There is a need for this directory function regardless of whether the documents themselves are stored in a computer or whether they are stored elsewhere. Moreover, it is a requirement of this directory function that it be possible through the use thereof to locate all types of documents, such as by exemplification but not necessarily limitation, contract drawings relating to the products to be manufactured, standard product drawings, product manufacturing process plans, product manufacturing rules, and NC programs.

The principal benefits which flow from the fact that the configuration management means 14 embodies such a directory function are two-fold. Namely, first it renders it possible to find needed product related information, i.e., data, quickly. To this end, at a minimum it is possible through the use of the directory function of the configuration management means 14 to find where the needed, i.e., requested, information is located although if such product related information, i.e., data, is not in a computerized form some time may be required to retrieve the product related information, i.e., data. Over the long term though, i.e., once all of the product related information, i.e., data, as well as the location thereof has been computerized, then both the locations and the retrieving of such product related information, i.e., data, will be able to be accomplished in a much more timely and expeditious fashion. In turn this reduces the cost involved in locating and in retrieving such product related information, i.e., data. More specifically, it is thus possible to avoid the costs associated with conducting long searches to find the required product related information, i.e., data, or the costs associated with reconstructing the product related information, i.e., data, that is needed because the latter could not be found or because it would have been too costly to try and locate the latter. Possibly though from the standpoint of the manufacturing process itself even more important than the cost savings which can be realized therefrom, i.e., from the use of the directory function which the configuration management means 14 embodies, is the fact that it is possible to shorten the time that it would otherwise take to accomplish the manufacturing process because the product related information, i.e., data, is capable of being obtained much more quickly when needed and is capable of being passed on to the next stage of the manufacturing process as soon as the need therefor exists at the next stage of the manufacturing process.

The benefits that have been described hereinbefore which one is capable of realizing through use of the repository/directory function that the configuration management means 14 embodies are capable of being increased further when the bill of information function which the configuration management means 14 also embodies and to which reference has previously been had herein in connection with the description of the integrated management system 10 as illustrated in FIG. 1 of the drawing wherein the bill of information function is denoted generally by the reference numeral 40 is coupled with the repository/directory function. With further regard to the matter of bills of information, a bill of information is similar in nature to a bill of materials or a product structure. To this end, a group of individual parts means nothing unless you also have the bill of materials therefor. For it is only then, i.e., from the bill of materials, that you can see how the individual parts are related one to another, i.e., how the individual parts are intended to fit together so as to form the product in question. Similarly, a collection of files and paper documents means very little unless you also have a bill of information which shows how this collection of files and paper documents are related one to another. Thus, it is to be understood that as employed herein the term "bill of information" is intended to encompass all of the following. Namely, the bill of information includes all of the design and manufacturing information needed to make the part or product. Further, the bill of information includes both the product structure, i.e., bill of materials, and all of the information about each part in the product. In addition, the bill of information also shows the relationships among the documents, such as when drawings or process plans refer to other standard drawings. In summary, the bill of information is the superstructure that gives the repository/directory function its power and flexibility.

Referring again to the configuration management means 14, in order to perform its intended role as one of the operating components of the integrated management system 10 constructed in accordance with the present invention the configuration management means 14 in accord with the best mode embodiment of the present invention is made to possess certain particular functional capabilities. Moreover, these functional capabilities which the configuration management means 14 is made to possess in order to perform its intended role as one of the operating components of the integrated management system 10 constructed in accordance with the present invention have been identified hereinbefore.

Figure 7:
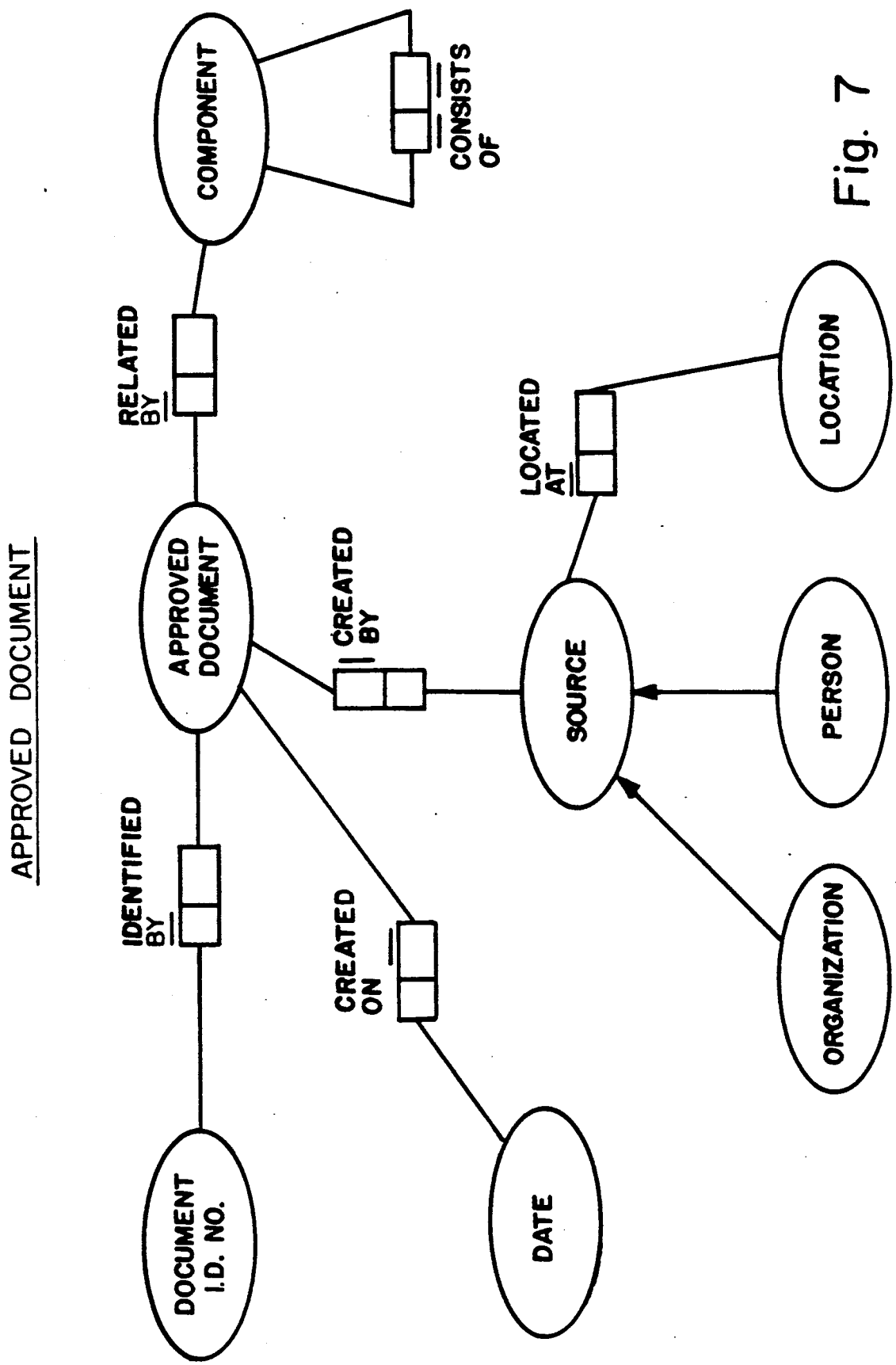
FIG. 7 is a schematic representation in block diagram form of the approve documents information required by the configuration management means of an integrated manufacturing system constructed in accordance with the present invention.

Attention is thus next focused herein on the nature of the information that is required to support these functional capabilities which the configuration management means 14 possesses. To this end, the configuration management means 14 in order to be able to perform the functions intended to be performed thereby as previously described herein must have available thereto the requisite information to be able to track approved documents and to relate them to components/parts and versions of components/parts. To facilitate such tracking, each approved document, which it is to be understood may relate to one or more parts, is identified by, i.e., bears, a document identification number. Also, since approved documents are created on a certain date and by a certain source, each approved document has an identifiable date and an identifiable source associated with it too. In addition, since each identifiable source has an identifiable location, each approved document further has associated therewith an identifiable location. Insofar as parts are concerned, each of the various parts is identified by a combination of a part number and a version number. In addition, the parts are related to each other through a product structure, i.e., through the "consists of" and the "used in" roles thereof. Therefore, in summary, to support the performance thereby of its various functions the configuration management means 14, as best understood with reference to FIG. 7 of the drawing, needs to have available thereto all of the information enumerated above, i.e., for documents, the document identification number and the date, source and location identification thereof, and for parts, the part number and version number therefor as well as the manner in which the parts relate one to another.

Figure 8:
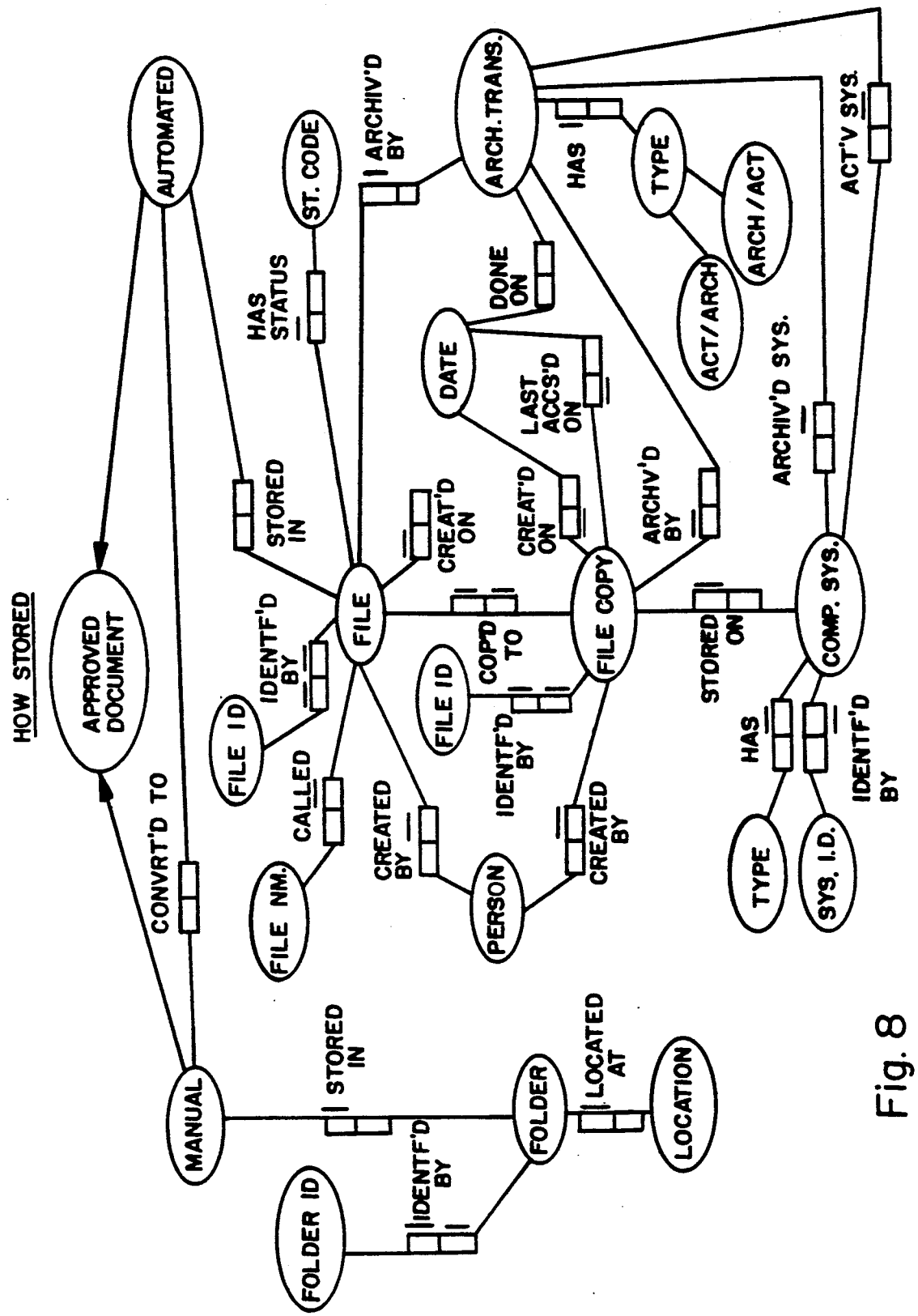
FIG. 8 is a schematic representation in block diagram form of the approve documents information, which is broken down by storage type, required by the configuration management means of an integrated manufacturing system constructed in accordance with the present invention.
Figure 9:
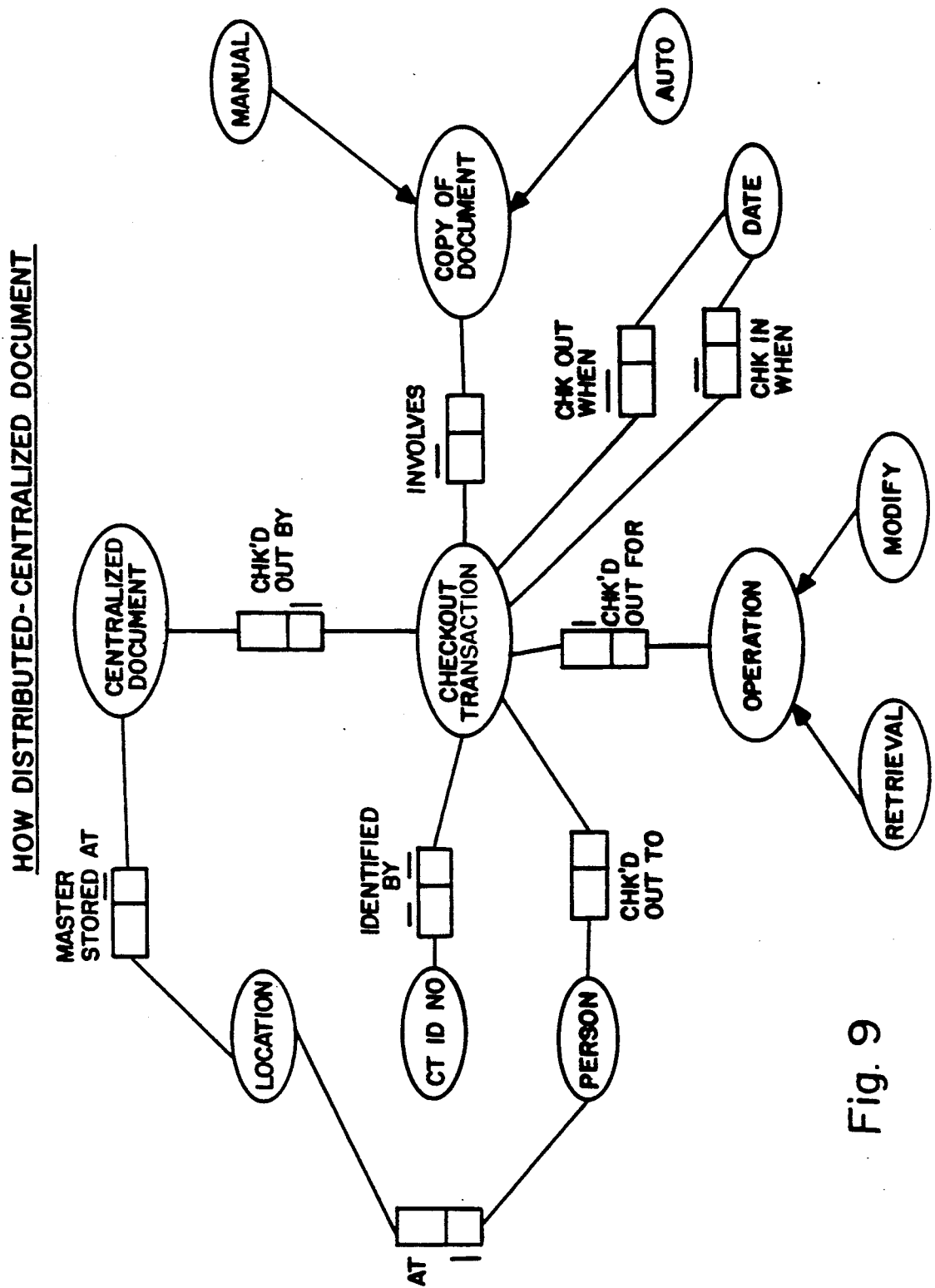
FIG. 9 is a schematic representation in block diagram form of the approve documents information, which is broken down according to central distribution, required by the configuration management means of an integrated manufacturing system constructed in accordance with the present invention.
Figure 10:
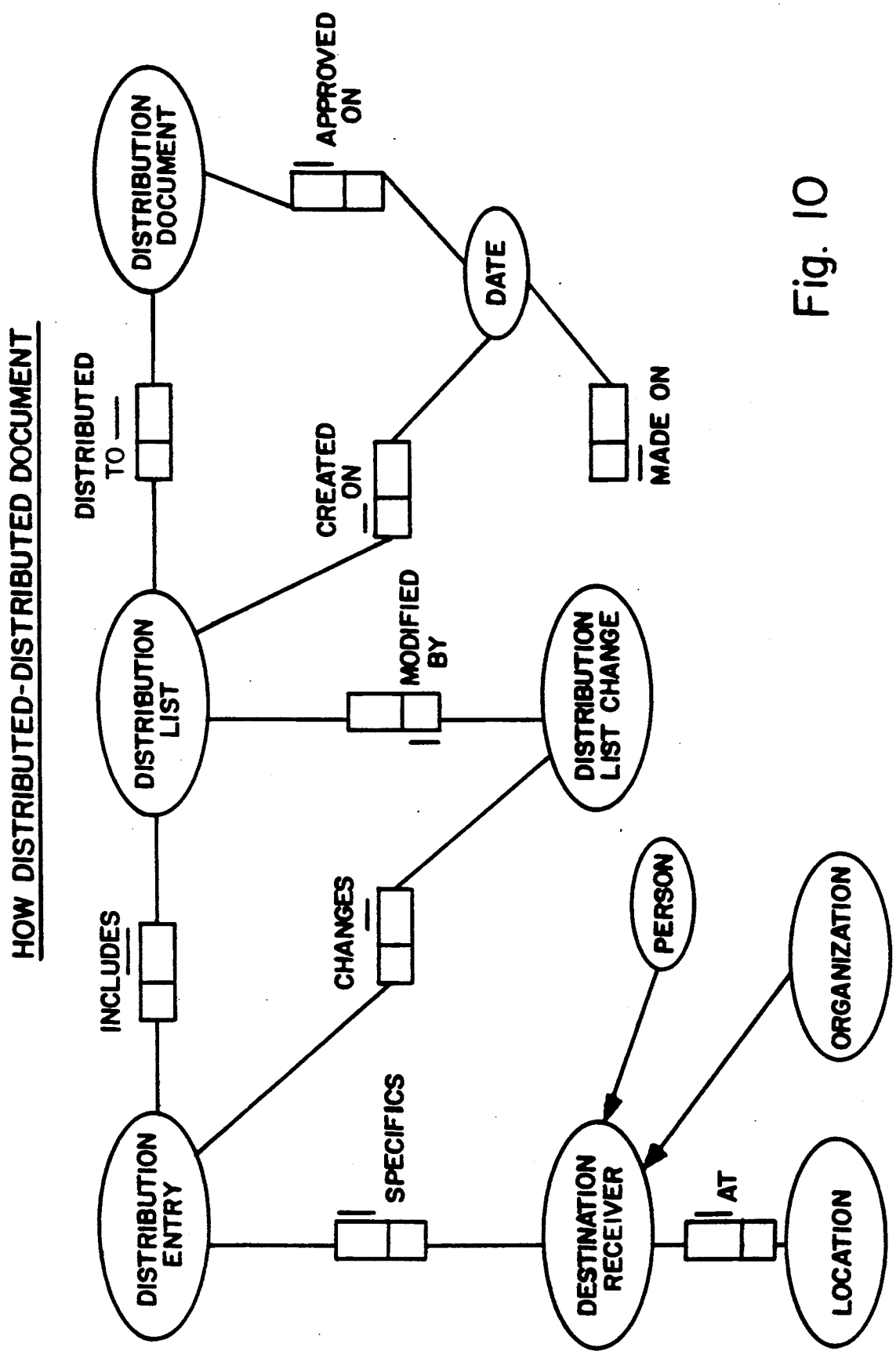
FIG. 10 is a schematic representation in block diagram form of the approve documents information, which is broken down according to distribution list, required by the configuration manufacturing system of an integrated manufacturing system constructed in accordance with the present invention.
Figure 11:
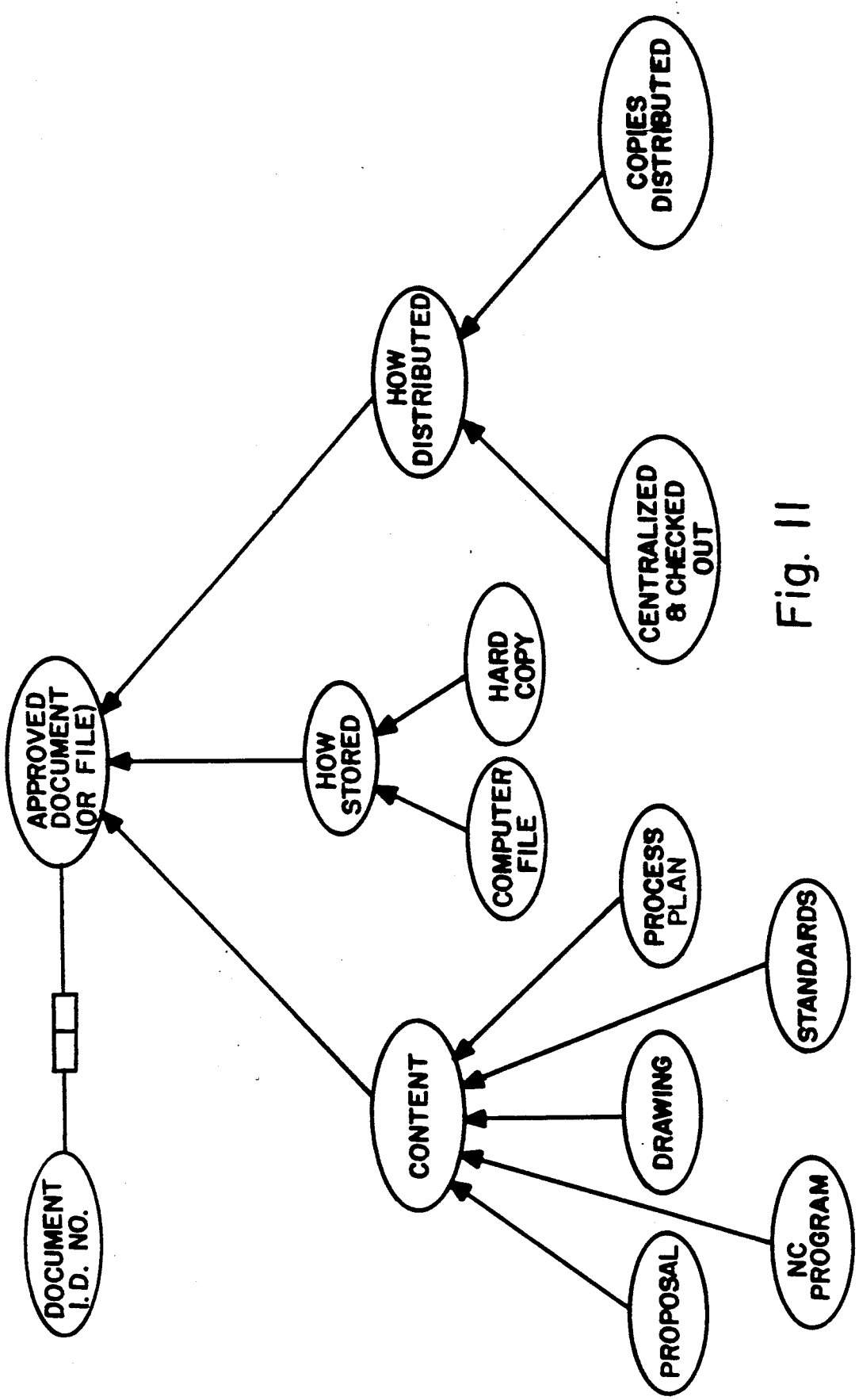
FIG. 11 is a schematic representation in block diagram form of the approve documents information, which is broken down according to content, how stored and how distributed, required by the configuration management means of an integrated manufacturing system constructed in accordance with the present invention.

With further regard to the matter of the information that is required to support the various functions which the configuration management means 14 is designed to perform, it is desirable that in this connection the approved documents be broken down by subtypes. One way of subtyping the approved documents is by content. To this end, insofar as content is concerned, the approved documents can be subtyped as specifications, proposals, contracts, drawings, standard drawings, solid models, process plans, shop orders, NC programs, etc. Another way of subtyping the approved documents is by how they are stored, i.e., as files on a computer or as hardcopy documents. While all approved documents have much information in common, FIG. 8 of the drawing contains an illustration of the information related by each storage type. Further to this point, note is made here of the fact that computer files may consist of text, graphic data created by a CAD system, or scanned images. Yet a third way of subtyping the approved documents is by how they are distributed. Namely, some such documents may be stored centrally and checked out as illustrated in FIG. 9 of the drawing, while for other documents copies may be sent to every one on a distribution list as best understood with reference to FIG. 10 of the drawing. The three ways of subtyping the approved documents enumerated above are, as best understood with reference to FIG. 11 of the drawing, each independent of each other.

Figure 12:
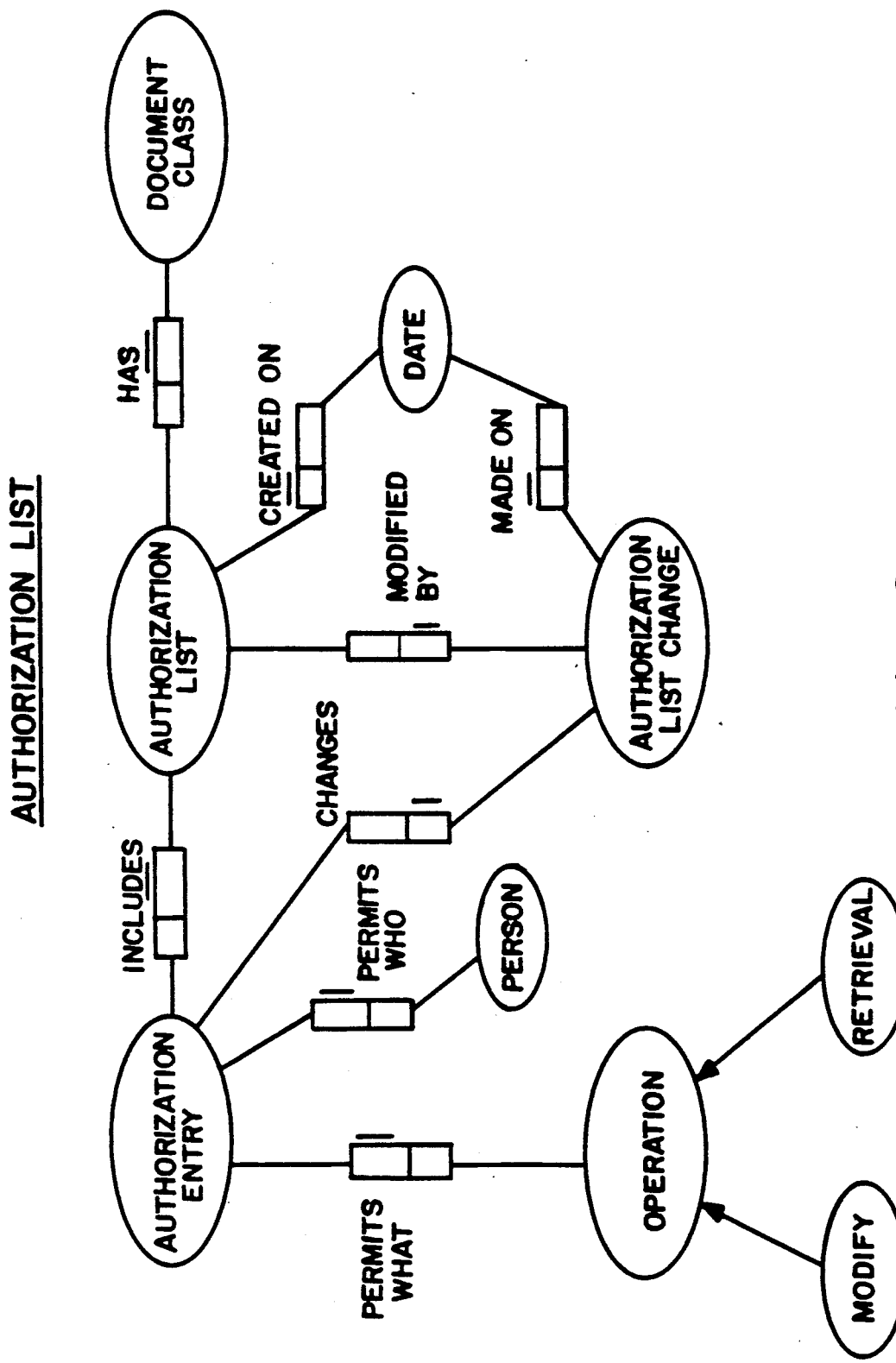
FIG. 12 is a schematic representation in block diagram form of the authorization list information required for access control purposes by the configuration management means of an integrated manufacturing system constructed in accordance with the present invention.

Continuing with this discussion of the information which is needed to support the functions that the configuration management means 14 is designed to perform, i.e., which is needed to enable the configuration management means 14 to perform the functions desired therefrom, one other consideration which must be borne in mind in this connection is the matter of how access to the approved documents is controlled. In this regard, as best understood with reference to FIG. 12 of the drawing, such access to the approved drawings is in accordance with the best mode embodiment of the invention preferably controlled through the use of an authorization list. To this end, each approved document class has an authorization list, which includes authorization entries. Each authorization entry in turn specifies a person and an operation, e.g., retrieve or modify. With further reference to the authorization list, since each authorization list is created on a certain date, each authorization list has a certain date identified therewith. It is to be understood here that the authorization list can be modified, such modification being had by means of an authorization list change, the latter being made on a certain date and being applicable to a specific entry on the authorization list.

In the case of centralized documents, to which reference has previously been had herein, the centralized documents, as best understood with reference to FIG. 9 of the drawing, are stored at an identifiable location and access thereto is controlled through checkout transactions. Continuing, each checkout transaction has an identifiable number associated therewith. The way in which these checkout transaction are employed is that for each such transaction a copy of the approved document in question is checked out to a person. Further, the checkout occurs on a certain date by which the checkout can be identified and the approved document in question may have an anticipated checkin date as well. The checkout transaction also specifies how the approved document in question will be used, i.e., for retrieval or modification, since many users can checkout a document for retrieval only, but only one user can have the document if it is going to be modified. There is a comparable checkin transaction, but it only has to be concerned with the actual date when the document was checked back in. However, there does exist a need for the checkin transaction to be related to a specific checkout transaction wherein the latter is identified by either the checkout transaction number or the combination of document identification for the specific copy of the approved document that is being checked back in, the person, and the date. In accordance with the best mode embodiment of the present invention, encompassed within the body of information, i.e., data, that is made available to the configuration management means 14 to support the accomplishment by the latter of the various functions that the configuration management means 14 is designed to perform as one of the operating components of the integrated management means 10 constructed in accord with the present invention, is the information, i.e., data, required for purposes of effectuating the aforedescribed checkout transactions and checkin transactions.

Figure 13:
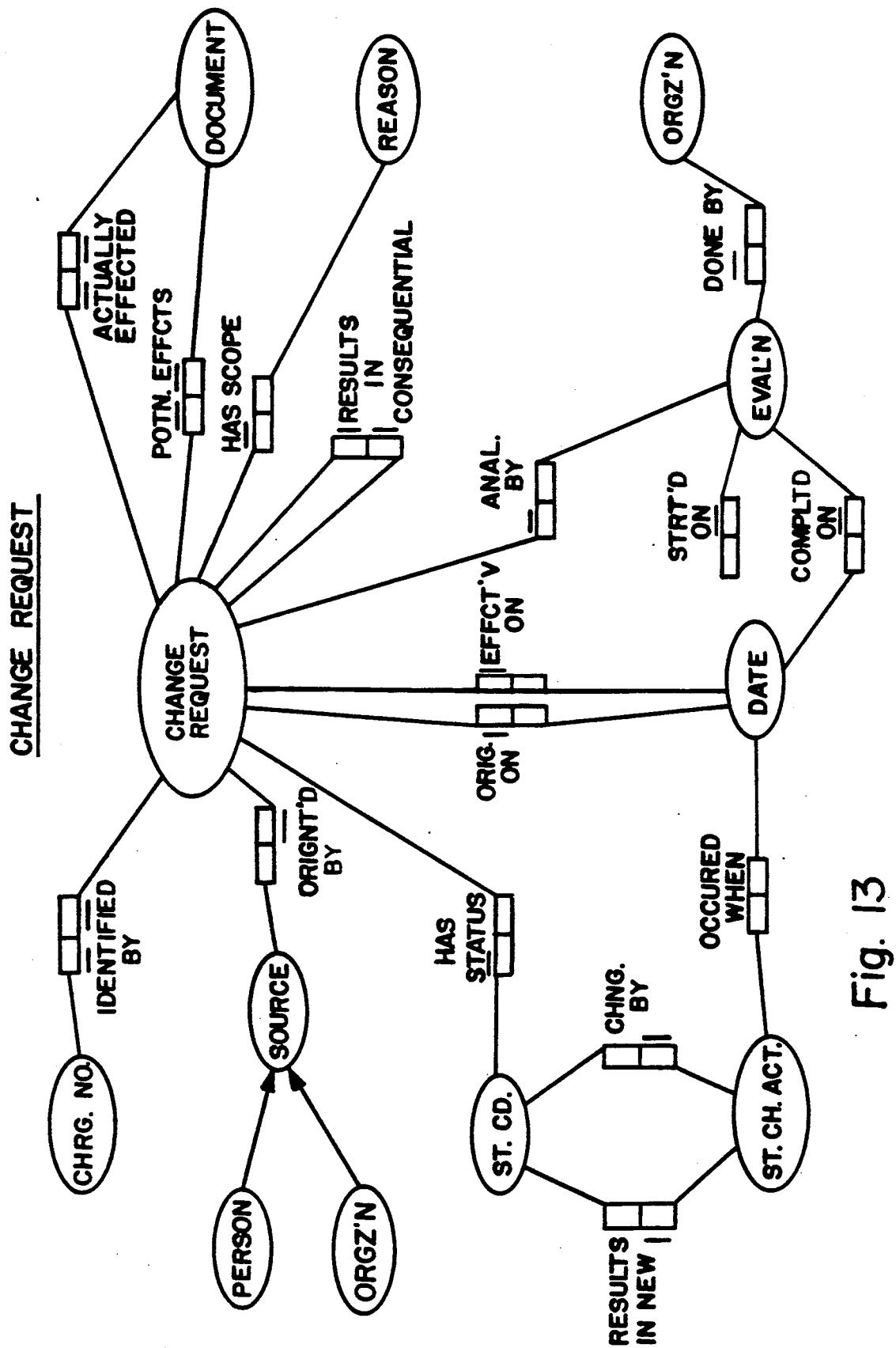
FIG. 13 is a schematic representation in block diagram form of the change requests information required by the configuration management means of an integrated manufacturing system constructed in accordance with the present invention.
Figure 14:
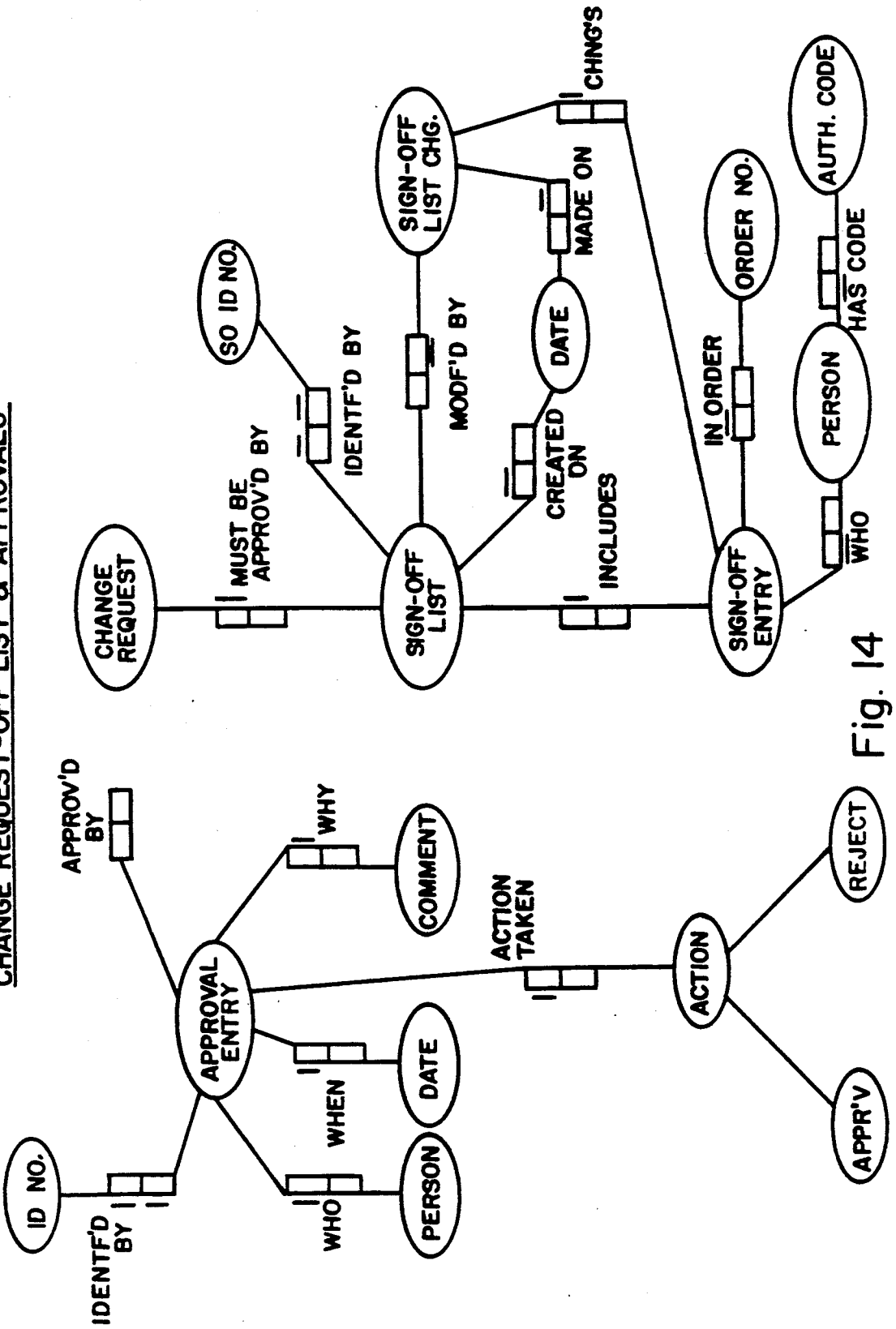
FIG. 14 is a schematic representation in block diagram form of the change requests information, which is broken down according to sign-off list and approvals, required by the configuration management means of an integrated manufacturing system constructed in accordance with the present invention.

Still another subject that needs to be addressed with respect to the nature of the information that is required to be made available to, i.e., that is required to be contained in, the configuration management means 14 to support the accomplishment by the latter of the various functions that the configuration management means 14 is designed to perform is the subject of changes. In this connection, consideration must be given to the need to relate change requests to particular approved documents and to the need to exercise control over such change requests through the medium of necessary sign-offs and approvals. In FIG. 13 of the drawing can be found an illustration of the nature of the information, i.e., data, which in accord with the best mode embodiment of the invention is deemed to be necessary in order to accomplish the handling by the configuration management means 14 of such change requests. Similarly, in FIG. 14 of the drawing can be found an illustration of the nature of the information, i.e., data, which in accord with the best mode embodiment of the present invention is deemed to be necessary in order to accomplish the handling by the configuration management means 14 of such change request sign-offs and approvals.

Figure 15:
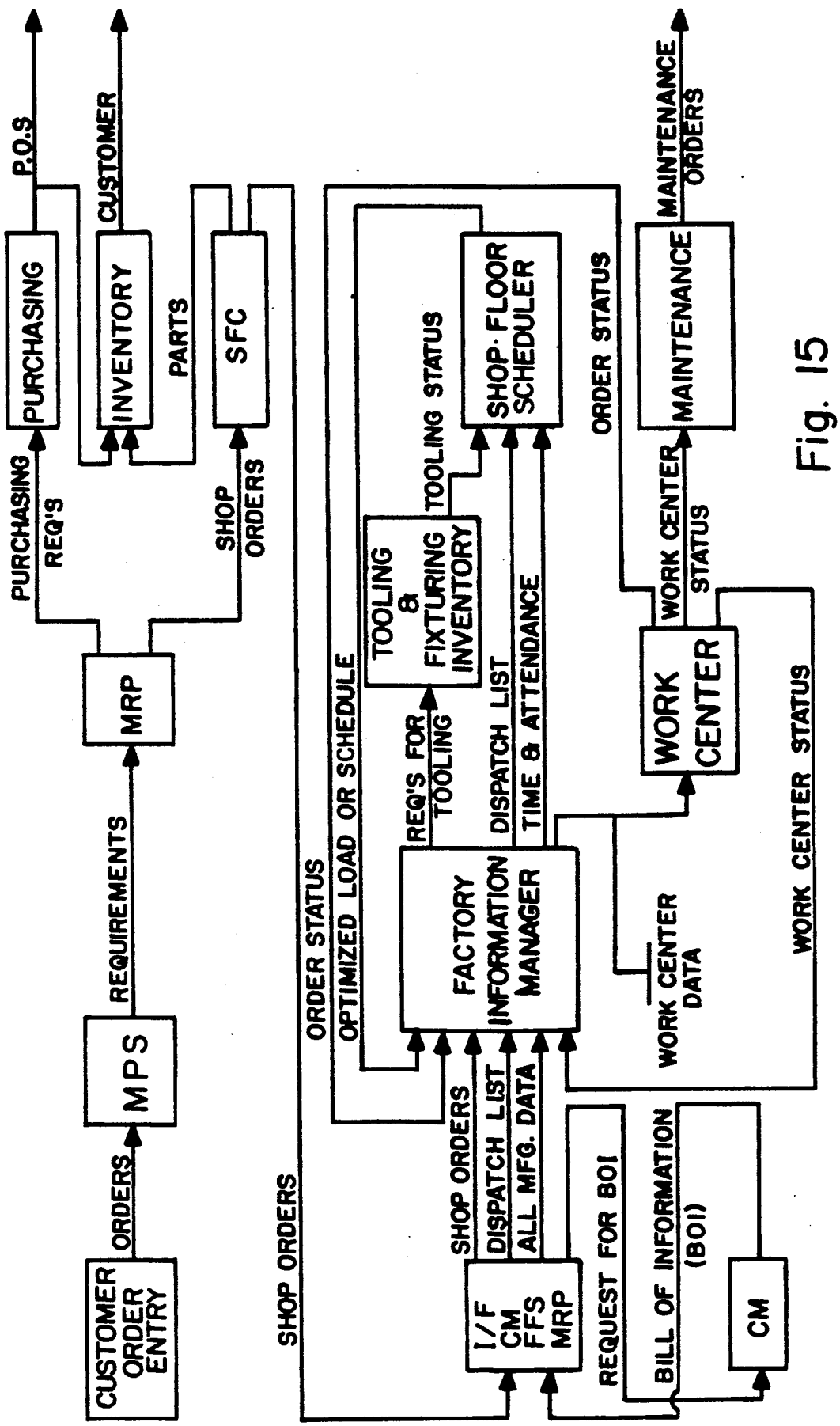
FIG. 15 is a schematic representation in block diagram form of the information flow through the manufacturing resource planning means of an integrated manufacturing system constructed in accordance with the present invention.

The next component of the integrated manufacturing system 10 constructed in accordance with the present invention to which reference will be had herein is the manufacturing resource planning means 16. The manufacturing resource planning means 16 functions as the source of information of a scheduling nature that is required for purposes of effectuating the manufacture of products on the factory floor. To this end, by way of exemplification and not necessarily limitation, the manufacturing resource planning means 16 as best understood with reference to FIG. 1 of the drawing functions as the source of information, i.e., data, of a scheduling nature, the latter being denoted generally therein by the reference numeral 82; of a purchase order/work order nature, the latter being denoted generally therein by the reference numeral 84; and of an inventory control nature, the latter being denoted generally therein by the reference numeral 86. The basic information flow through the manufacturing resource planning means 16 in accord with the best mode embodiment of the invention is thus as depicted in FIG. 15 of the drawing.

Figure 16:
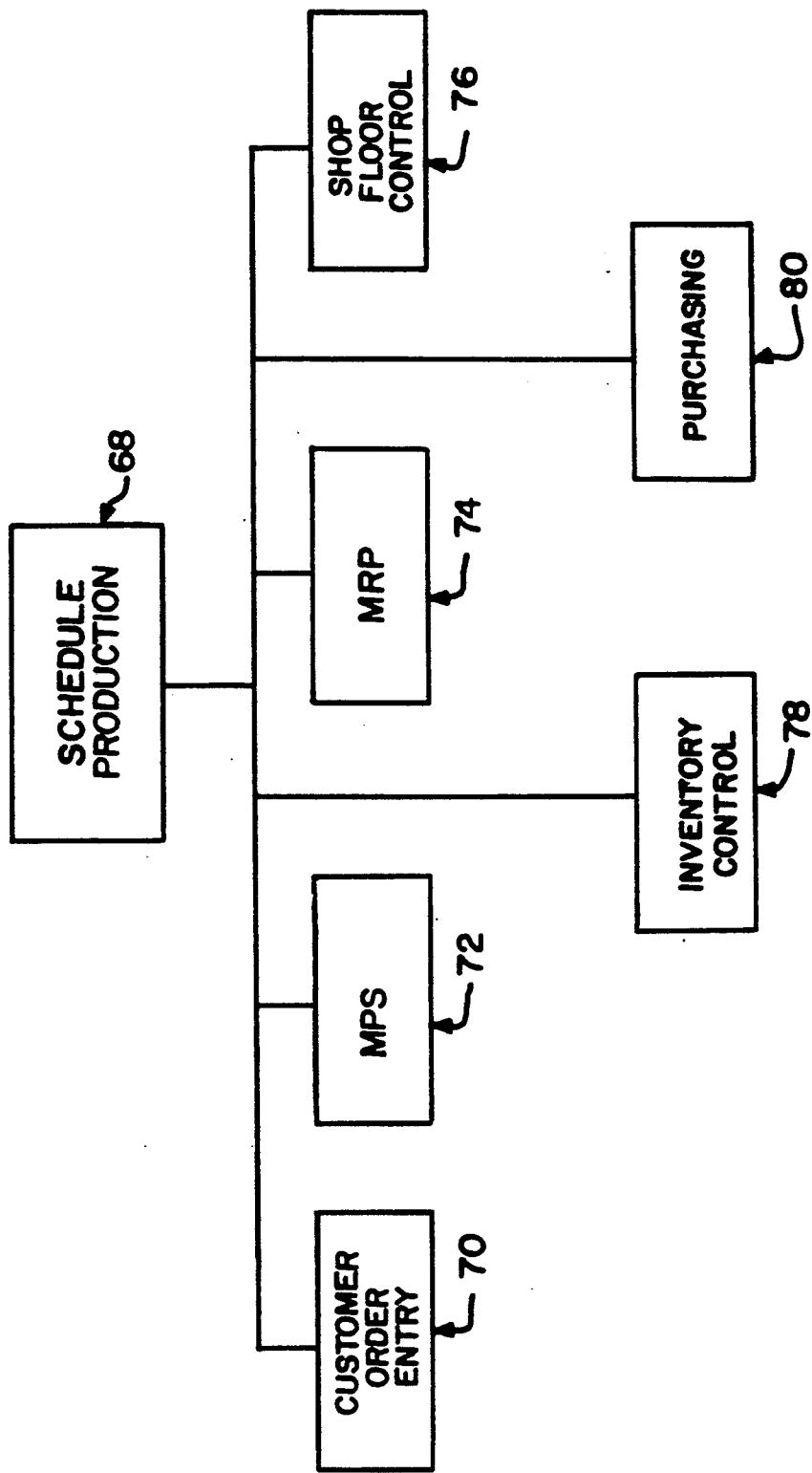
FIG. 16 is a schematic representation in block diagram form of the scheduling function of the manufacturing resource planning means of an integrated manufacturing system constructed in accordance with the present invention.

With further reference to the manufacturing resource planning means 16, and in particular the scheduling function thereof, the various elements which in accord with the best mode embodiment of the present invention comprise the scheduling function of the manufacturing resource planning means 16 can be found illustrated in FIG. 16 of the drawing. Namely, as best understood with reference to FIG. 16 of the drawing, the scheduling function, which is denoted therein generally by the reference numeral 68, of the manufacturing resource planning means 16 includes customer order entry, denoted therein generally by the reference numeral 70; master production schedule (MPS), denoted therein generally by the reference numeral 72; material requirements planning (MRP), denoted therein generally by the reference numeral 74; and shop floor control, denoted therein generally by the reference numeral 76. However, this latter shop floor control element 76 serves only to generate the shop orders and the dispatch lists. Both of these outputs, i.e., the shop orders and the dispatch lists, identify the specific operations that are scheduled and their resource and time requirements. The difference is that in accord with the mode of operation thereof the shop orders output is operative to group all of the operations for a specific shop order. On the other hand, in accord with the mode of operation of the dispatch list output, the latter output groups all of the operations by work center. More specifically, the dispatch list for a particular work center lists all of the operations that need to be performed at that particular work center regardless of shop order. As can be seen with reference to FIG. 16 of the drawing, associated with the scheduling function 68 of the manufacturing resource planning means 16 are two additional elements. These are inventory control, the latter being denoted generally by the reference numeral 78 in FIG. 16 of the drawing, and purchasing, which is denoted generally in FIG. 16 of the drawing by the reference numeral 80. In conclusion, note is also made here of the fact that the manufacturing resource planning means 16 traditionally includes a costing module in addition. However, since such a costing module is not directly related to scheduling, it is for this reason that a discussion thereof in connection with the description of the elements depicted in FIG. 16 of the drawing has been omitted.

Referring again to FIG. 1 of the drawing, it can be seen therefrom that another component yet to be described herein, which the integrated manufacturing system 10 constructed in accordance with the present invention preferably also embodies, is the other design/manufacturing source means 20. Moreover, when the subject integrated manufacturing system 10 also embodies the other design/manufacturing information source means 20 the latter is designed to function in the nature of an additional source of design information and/or manufacturing information. More specifically, by way of exemplification and not necessarily limitation, the other design/manufacturing information source means 20 functions as a source of information such as information, i.e., data, of a detail drafting nature, the latter being depicted generally at 88 in FIG. 1 of the drawing, and of a numerical control (N/C) programming nature, the latter being depicted generally at 90 in FIG. 1 of the drawing.

The final component of the integrated manufacturing system 10 constructed in accordance with the present invention, which has yet to be described herein, is the factory floor means, the latter as noted herein previously being depicted at 18 in FIG. 1 of the drawing. The factory floor means 18, in accord with the best mode embodiment of the present invention, functions as the source of information relating to the operations that take place on the factory floor during the course of effectuating thereat the manufacture of products. To this end, the factory floor means 18 functions as the source of information which by way of exemplification and not necessarily limitation includes information, i.e., data, of a work center load nature, the latter being depicted generally at 92 in FIG. 1 of the drawing; of a general work center operations nature, the latter being depicted generally at 94 in FIG. 1 of the drawing; of a manufacturing method nature, the latter being depicted generally at 96 in FIG. 1 of the drawing; of a data collection nature, the latter being depicted generally at 98 in FIG. 1 of the drawing; of a direct numerical control (DNC) nature, the latter being depicted generally at 100 in FIG. 1 of the drawing; of a quality feedback nature, the latter being depicted generally at 102 in FIG. 1 of the drawing; of a maintenance nature, the latter being depicted generally at 104 in FIG. 1 of the drawing; and of a tooling/fixture status nature, the latter being depicted generally at 106 in FIG. 1 of the drawing.

Continuing with the discussion of the factory floor means 18, it is deemed to be desirable at this point for purposes of ensuring that there exists no misunderstanding with respect thereto that there be set forth herein once again the fact that in the integrated manufacturing system 10 constructed in accordance with the present invention, it is the factory floor means 18 that provides the manufacture product function, i.e., that effectuates the actual manufacture on the factory floor of the product desired by the customer. Moreover, as best understood with reference to FIG. 17 of the drawing, insofar as the manufacture product function, the latter being depicted at 108 in FIG. 17, of the factory floor means 18 is concerned, there are essentially five major elements, which collectively comprise the manufacture product function 108. As best seen with reference to FIG. 17 of the drawing, these five major elements are that of data collection, the latter being depicted at 110 in FIG. 17; that of data distribution, the latter being depicted at 112 in FIG. 17; that of maintenance, the latter being depicted at 114 in FIG. 17; that of tooling, the latter being depicted at 116 in FIG. 17; and that of quality, the latter being depicted at 118 in FIG. 17.

Figure 18:
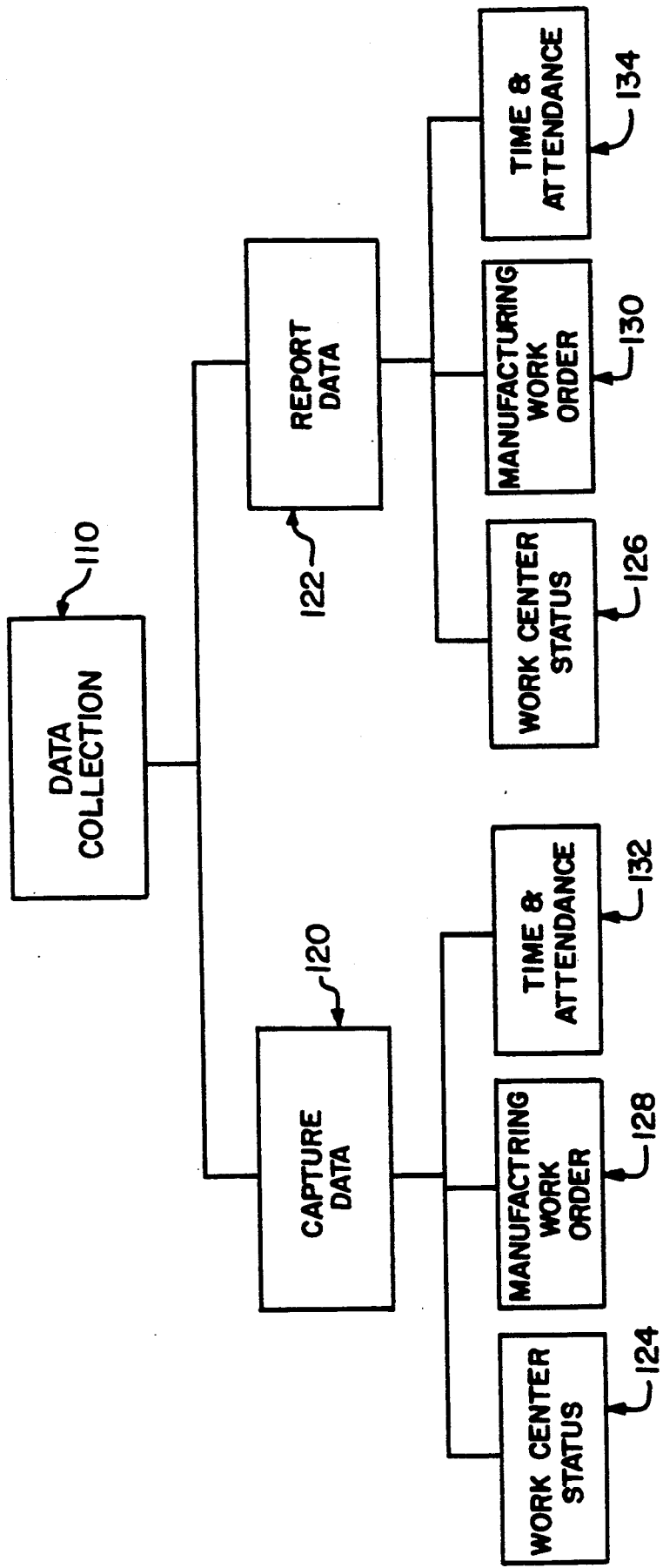
FIG. 18 is a schematic representation in block diagram form of the data collection element of the manufacture product function of the factory floor means of an integrated manufacturing system constructed in accordance with the present invention.

Focusing attention first on the data collection element 110, the latter has only two subfunctions associated therewith. As best seen with reference to FIG. 18 of the drawing, these two subfunctions are to capture data, the latter being depicted at 120 in FIG. 18, and to report data, the latter being depicted at 122 in FIG. 18. Each of these two subfunctions 120 and 122 capture and report, respectively, on at least the same three different types of data, i.e., work center data, the latter being depicted at 124 and 126, respectively, in FIG. 18; manufacture work order (shop order) status, the latter being depicted at 128 and 130, respectively, in FIG. 18; and time and attendance data, the latter being depicted at 132 and 134, respectively, in FIG. 18. Some data pertaining to work center status 124,126 may be captured, i.e., obtained, through a monitoring of the particular work centers, but in the case of the work center status 124,126 of other particular work centers data (e.g., work center breakdown) must be explicitly entered manually. Some examples of data pertaining to work center status 124,126 include idle, working on an order, waiting for material, waiting for an operator, down for unscheduled repair, and down for preventive maintenance. On the other hand, all manufacture work order status 128,130 must be entered manually. To this end, manufacture work order status 128,130 is really captured as a status for each operation within the order. By way of illustration in this regard, an operation may be scheduled, started, completed, or in process (sometimes with a percent completed or a number of parts complete). Transactions to indicate what is being done are entered manually when operations are started or stopped. These transactions in turn provide the necessary information for updating the manufacturing work order status 128,130. Thus, by way of summary, the transactions pertaining to manufacture work order status 128,130 that are entered manually include those of selecting an operation, of starting an operation, of completing an operation and of stopping an operation, which in the case of the latter in addition requires the number of units produced or the percent completed to be also inputted as part of the transaction.

Next attention will be directed herein to the data distribution element 112 of the manufacture product function 108 of the factory floor means 18. In accord with the intended mode of operation thereof the data distribution element 112 in accord with the best mode embodiment of the present invention involves the identifying of and the moving of information, i.e., data, between the configuration management means 14 and the factory floor means 18, and between the factory floor means 18 and the appropriate work centers whereat the various operations required in the course of manufacturing the product desired by the customer are actually performed. As best seen with reference to FIG. 19 of the drawing, the data distribution element 118 in accord with the best mode embodiment of the present invention consists of a minimum of four subfunctions. These four subfunctions, each of which can be found illustrated in FIG. 19 of the drawing, are the following: checkout and download the bill of information (from the configuration management means 14 to the factory floor means 18), the latter being depicted generally at 136 in FIG. 19; checkout and download work center files (from the factory floor means 18 to the appropriate individual work centers), the latter being depicted generally at 138 in FIG. 19; check in work center files (to the factory floor means 18 from the appropriate individual work centers), the latter being denoted generally at 140 in FIG. 19; and check in bill of information (to the configuration management means 14 from the factory floor means 18), the latter being denoted generally by the reference numeral 142 in FIG. 19.

Figure 20:
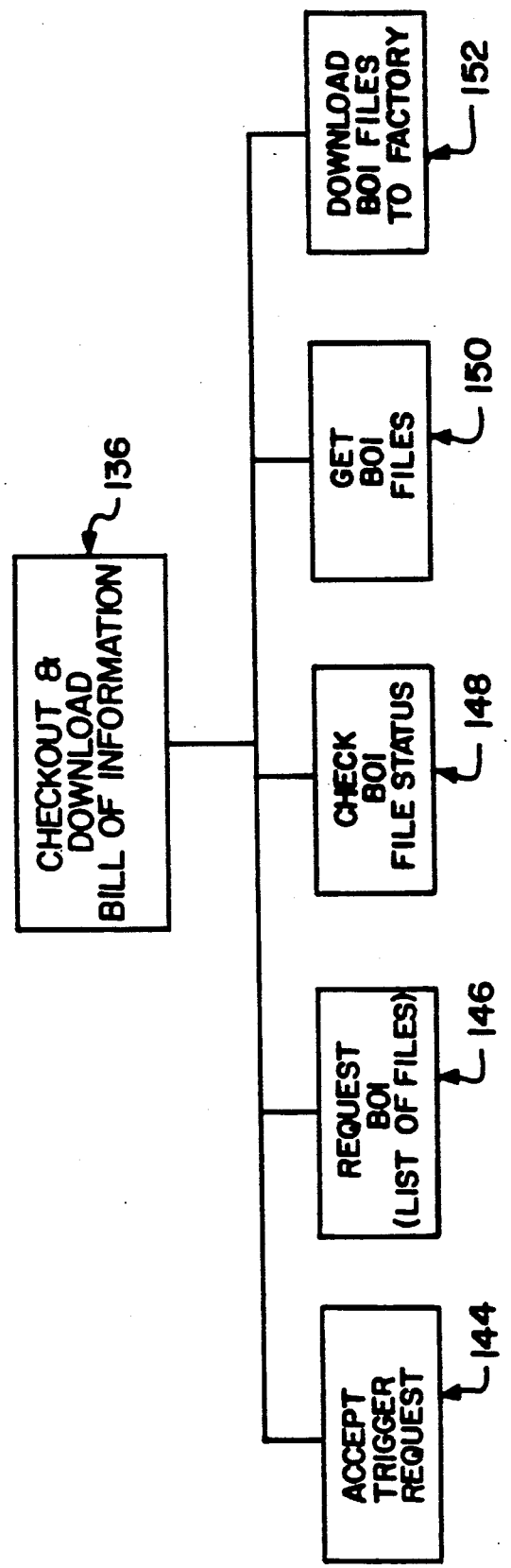
FIG. 20 is a schematic representation in block diagram form of the checkout and download bill of information subfunction of the data distribution element of the manufacture product function of the factory floor means of an integrated manufacturing system constructed in accordance with the present invention.

Consideration will now be had herein in greater detail to the checkout and download bill of information subfunction 136 of the data distribution element 112. Moreover, for this purpose reference will be had in particular to FIG. 20 of the drawing. Referring thus to FIG. 20, as illustrated therein the checkout and download bill of information subfunction 136 in accord with the best mode embodiment of the present invention encompasses the five following subelements: accept trigger request, request bill of information, check bill of information file status, get bill of information files, and download bill of information files to factory floor. These five subelements are illustrated in FIG. 20 at 144,146,148,150 and 152, respectively.

With further reference to FIG. 20, as depicted therein the checkout and download bill of information subfunction 136 first must accept a trigger request, i.e., subelement 144, that indicates what information needs to be downloaded. In this regard, the trigger most commonly employed for this purpose is the shop order or dispatch list from the manufacturing resource planning means 16. A request from the factory floor or a work center for a file that has not already been downloaded may also, however, serve as an additional form of trigger. In either case, though, the trigger must provide enough information to determine what files are needed, when they are needed, where they are needed, and how they are to be used. These files in most instances will only be checked out for read-only use. However, in a few instances there may actually exist a need to modify one or more of these files. In which event, if one or more of these files do need to be modified, then the new version, i.e., the modified version, of the file or files will also have to be returned as part of the subsequent check in transaction, e.g., in accordance with check in work center files subfunction 140 and/or check in bill of information subfunction 142.

Next, in accord with the mode of operation thereof the checkout and download bill of information subfunction 136 is designed to request the bill of information, i.e., subelement 146. The bill of information to which reference is had here, i.e., that contemplated by subelement 146, comprises the list of files needed to actually manufacture on the factory floor the product desired by the customer. In this regard, for some applications it may be desirable to subdivide the bill of information into an engineering bill of information and a manufacturing bill of information. The intended mode of operation of the subelement 146, i.e., request the bill of information, is simply to return a list of the files in the bill of information, i.e., to simply provide a listing of the files in the bill of information. In this connection it should be noted here that a request directly from the factory floor for a specific file would bypass the request the bill of information subelement 146 and would be transmitted directly from the accept trigger request subelement 144 to the check bill of information file status subelement 148.

Turning now to a discussion of the check bill of information file request subelement 148, the role thereof is to check the file status for all of the bill of information files or all of the requested files. This involves checking with the configuration management means 14 to ensure that all of the needed files have been released and are available for use on the factory floor. A similar request will normally also have been made of the configuration management means 14 by the manufacturing resource planning means 16 such that a shop order will not have been released by the manufacturing resource planning means 16 unless all of the necessary data files have also been released. However, this may not always be possible. For example, if there is a tight delivery schedule and the product desired by the customer will take three months to manufacture, some of the operations in the manufacturing process may need to be started on or before all of the data, e.g., data needed for purposes of operations to be performed toward the end of the manufacturing process, is available. Another possibility is that all of the data may have been released when the shop order was generated, but subsequently a problem may have been found causing the data to be "unreleased". Therefore, a status check must be done at this point, i.e., the check bill of information file status subelement 148 must perform the role intended thereof, even if in doing so the effect thereof is to simply repeat something which was done previously.

Continuing with the discussion of the check bill of information file request subelement 148, there are several problems which can occur during the aforedescribed status check. For example, it may be found that one file in the bill of information 40 has a status that prevents it from being downloaded. This in turn may stem from the fact that the file has not been released, or from the fact that the file has already been downloaded for update. In any event, in such a case there then arises a question as to whether the entire shop order should be held up pending availability of the file in question, or whether only those operations that need that particular file should be held up.

The next subelement of the checkout and download bill of information subfunction 136 to be discussed herein is the get bill of information subelement 150. In accord with the mode of operation intended thereof, the get bill of information subelement 150 is operative to get all of the files in the bill of information 40. To this end, there is a need to be concerned with the fact that hardcopy documents may be a part of the bill of information 40. The configuration management means 14 is capable of tracking and controlling these hardcopy documents as well as computerized data. However, the configuration management means 14 does not embody the capability whereby it would be possible therewith to retrieve and download such hardcopy documents. As such, one way of overcoming this limitation is to provide the configuration management means 14 with, i.e., to store electronically therewithin, an access procedure for hardcopy documents. By way of exemplification and not limitation in this regard, reference is had here to the fact that hardcopy documents can be scanned and stored as raster images in the configuration management means 14 such that they then can thereafter be transmitted therefrom electronically.

For purposes of completing the discussion of the checkout and download bill of information subfunction 136, a description will now be had herein of the download bill of information files to the factory floor subelement 152. The download bill of information files to the factory floor subelement 152 is designed to be operative such that therethrough either one file which was specifically requested may be downloaded or such that therethrough all of the files in the bill of information may be downloaded.

Before leaving the subject of the checkout and download bill of information subfunction 136, a further comment will be had herein with respect to the get bill of information subelement 150 and the download bill of information files to factory floor subelement 152. To wit, some of the products specified in a shop order, i.e., a manufacturing order, may take several months to complete. In such a case, all of the files in the bill of information should not be downloaded initially. Rather, the files in the bill of information should be downloaded as they are needed. As such, it is desirable that within the checkout and download bill of information subfunction 136 there be encompassed a mechanism for identifying downloadable material and when such material should be downloaded. On the other hand, an alternative approach thereto would be to initially check the file status for all of the files in the bill of information as determined by the shop order, but to only download files as they are required for purposes of accomplishing operations on the factory floor. In other words, the shop order may be released and all of the files in the bill of information may be released and available, but individual files will not be downloaded until the operation that requires them is scheduled to be performed on the factory floor. If this alternative approach is taken, it will be necessary before the files are downloaded that their status be checked once again. The advantages associated with this alternative approach are that it minimizes both the storage requirements on the factory floor and the amount of data that has to be downloaded at once.

Figure 21:
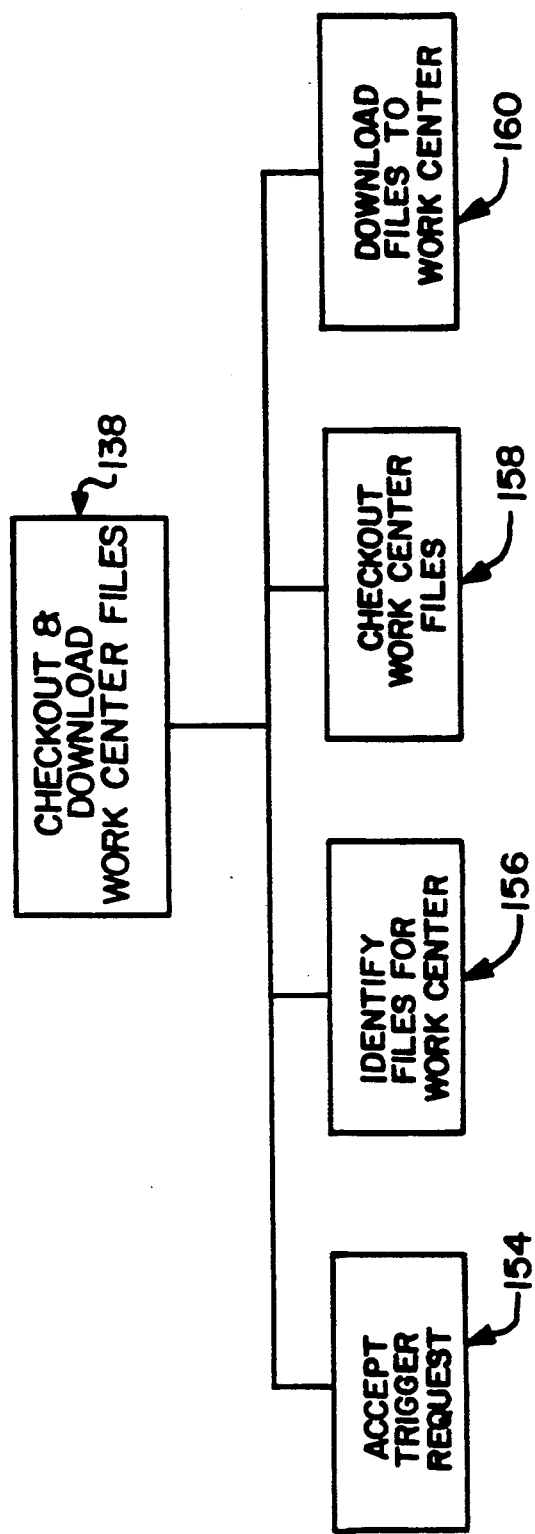
FIG. 21 is a schematic representation in block diagram form of the checkout and download the work center files subfunction of the data distribution element of the manufacture product function of the factory floor means of an integrated manufacturing system constructed in accordance with the present invention.

Continuing with the discussion of the data distribution element 112 of the manufacture product function 108 of the factory floor means 18, attention will next be focused on the checkout and download the work center files subfunction 138 thereof. For this purpose, reference will be had in particular to FIG. 21 of the drawing. As will be readily apparent from even a cursory examination of both FIG. 20 and FIG. 21 of the drawing, the checkout and download the work center files subfunction 138 bears a great deal of similarity to the checkout and download bill of information subfunction 136, which has been described previously herein, except for the fact that the checkout and download the work center files subfunction 138 is designed to be operative to download files from the factory floor means 18 to the appropriate individual work centers whereas the checkout and download bill of information subfunction 136 is designed to be operative to download files from the configuration management means 14 to the factory floor means 18. Thus, the checkout and download the work center files subfunction 138 and the checkout and download bill of information subfunction 136 both encompass a similar set of subelements. To this end, the checkout and download bill of information subfunction 136 encompasses, as has been described hereinbefore, the following five subelements: accept trigger request subelement 144, request bill of information subelement 146, check bill of information file status subelement 148, get bill of information files subelement 150 and download bill of information files to factory floor subelement 152. Similarly, the checkout and download the work center files subfunction 138 encompasses the following four subelements: the accept a trigger request from a work center subelement 154, the identify the files for the work center subelement 156, the checkout work center files subelement 158 and the download files to work center subelement 160.

Many of the same considerations which apply to the checkout and download bill of information subfunction 136 are also applicable to the checkout and download work center files subfunction 138. By way of exemplification and not limitation in this regard, reference is had here to such considerations as the nature of the triggers which are employed to initiate requests to the checkout and download bill of information subfunction 136 and to the checkout and download work center files subfunction 138. Another such consideration is the matter of when to download which file or files. In this connection, with specific reference to the checkout and download work center files subfunction 138, by knowing the operation that is to be performed all of the files that are required therefor may be identified, but the operator at the individual work center may not need all of them. As such, the checkout and download work center files subfunction 138 is designed to be operative such that some files may always be downloaded if they are explicitly needed. Another consideration which needs to be addressed in the case of the checkout and download work center files subfunction 138 is that of how to deal with a bad file status such as, for instance, if another work center has requested the file for update. Also, there is the matter of what happens if a work center requests a file that has not yet been downloaded from the configuration management means 14 to the factory floor means 18. In such a case, a suitable request should flow from the factory floor means 18 to the configuration management means 14 and in response to such a request the file when it is requested should, if possible be downloaded, i.e., passed down to the work center where it is needed. Namely, the user at a work center should be able to get the file that is needed regardless of where the file may be.

Figure 19:
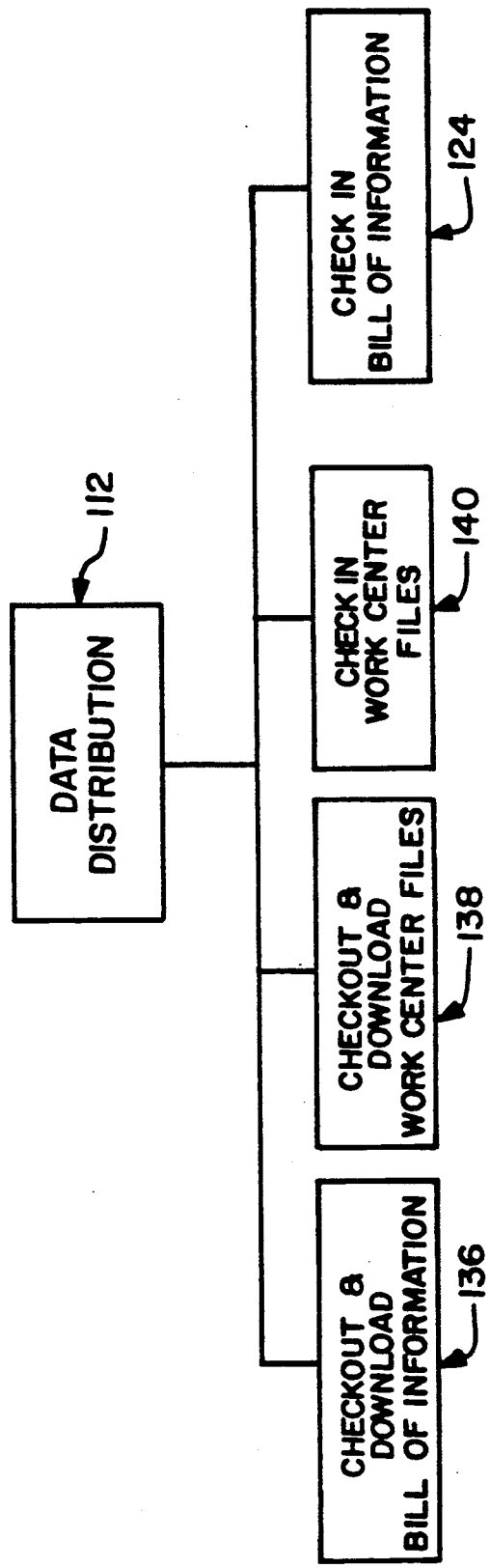
FIG. 19 is a schematic representation in block diagram form of the data distribution element of the manufacture product function of the factory floor means of an integrated manufacturing system constructed in accordance with the present invention.
Figure 22:
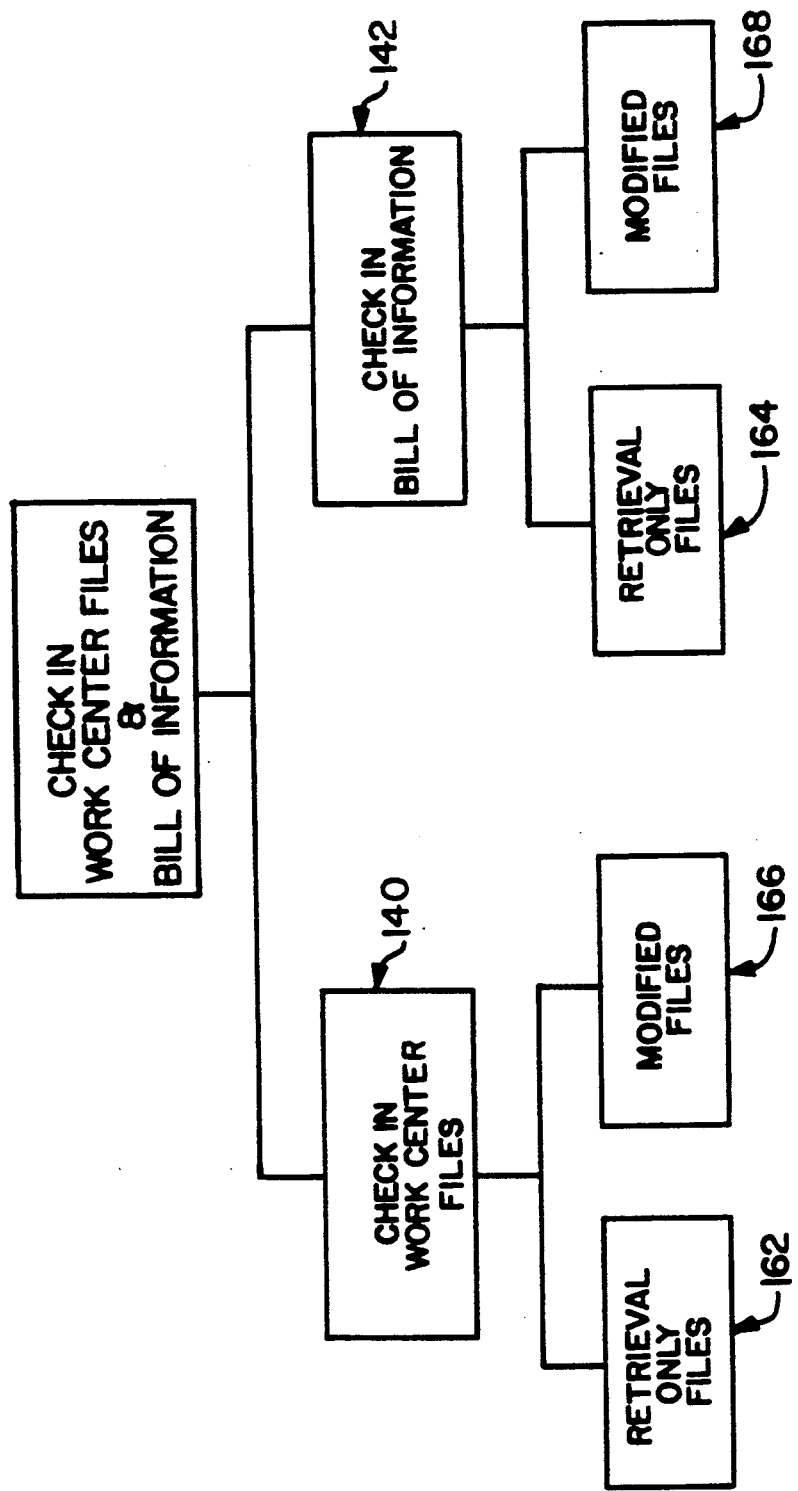
FIG. 22 is a schematic representation in block diagram form of both the check in work center files subfunction and the check in bill of information subfunction of the data distribution element of the manufacture product function of the factory floor means of an integrated manufacturing system constructed in accordance with the present invention.

With further reference to the data distribution element 112 of the manufacture product function 108 of the factory floor means 18, the last two subfunctions thereof that are yet to be described herein are those of the check in work center files subfunction 140 to which reference has previously been had herein in connection with the discussion of FIG. 19 of the drawing and the check in bill of information subfunction 142 which has also been referred to herein previously in connection with the discussion of FIG. 19 of the drawing. Inasmuch as the check in work center files subfunction 140 and the check in bill of information subfunction 142 bear so much similarity one to another, it is deemed desirable for purposes of the discussion thereof, which follows herein, that they be discussed together. Moreover, for purposes of this discussion reference will be had in particular to FIG. 22 of the drawing. Basically, the main difference between the check in work center files subfunction 140 and the check in bill of information subfunction 142 is that the check in work center files subfunction 140 is designed to be operative to check in files to the factory floor means 18, the latter function being schematically depicted at 162 in FIG. 22 under the heading "Retrieval Only Files", whereas the check in bill of information subfunction 142 on the other hand is designed to be operative to check in files to the configuration management means 14, the latter function being schematically depicted at 164 in FIG. 22 under the heading "Retrieval Only Files". In either case, i.e., in the case of the check in work center files subfunction 140 or in the case of the check in bill of information subfunction 142, a check in simply changes the status of the file being checked in. Since most files will be checked out for retrieval only, the effect of the check in function is to simply delete the lower level copy, i.e., the one at the individual work center or at the factory floor means 18, respectively. This is because the original copy of the file is maintained first in the configuration management means 14 and is thereafter maintained at the factory floor means 18. Unless the downloaded copy of the file is changed, it does not need to be transferred back up during the check in. However, if the file is changed, it should be returned from whence it came as a new version. It should not replace the current version. The fact that such changes to the files may occur is acknowledged in FIG. 22 under the heading "Modified Files" at 166 and 168, respectively. Further to this point of changes to the files, mention is made here of the fact that among the functions which the configuration management means 14 is designed to perform are those of keeping track of and of relating to each other the respective versions of the files.

Figure 17:
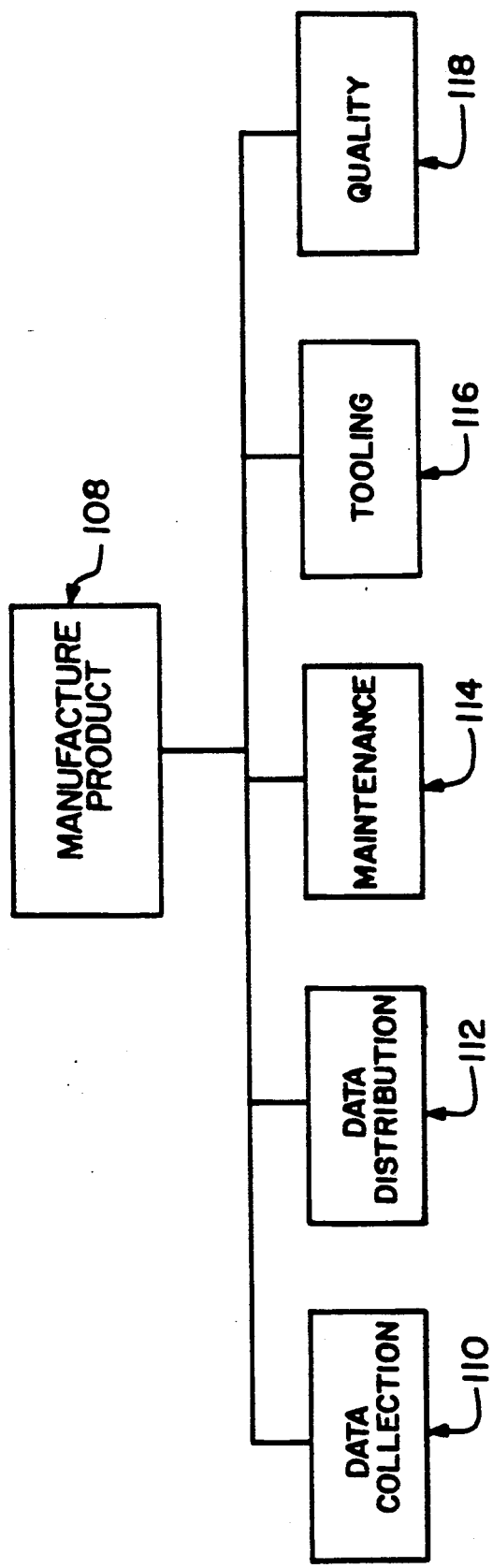
FIG. 17 is a schematic representation in block diagram form of the manufacture product function of the factory floor means of an integrated manufacturing system constructed in accordance with the present invention.
Figure 23:
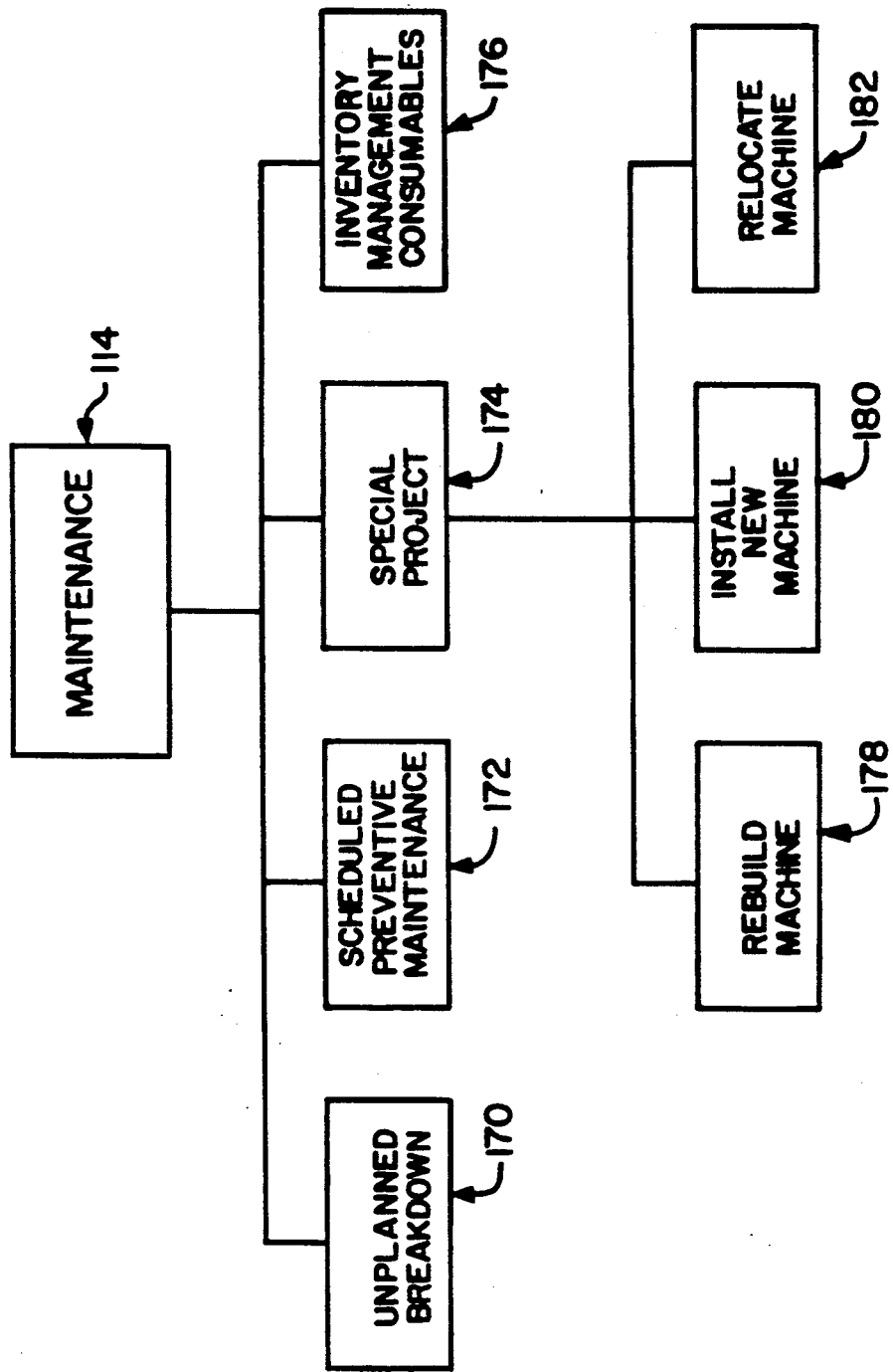
FIG. 23 is a schematic representation in block diagram form of the maintenance element of the manufacture product function of the factory floor means of an integrated manufacturing system constructed in accordance with the present invention.

With further reference to the five major elements that collectively comprise the manufacture product function 108 of the factory floor means 18, a discussion will now be had herein of the third of these major elements; namely, that of the maintenance element which is seen at 114 in FIG. 17 of the drawing. As best understood with reference to FIG. 23 of the drawing, the maintenance element 114 in accord with the illustrated embodiment of the present invention preferably embodies four subfunctions. These four subfunctions are the following: the managing unplanned breakdowns subfunction which is identified generally by the reference numeral 170 in FIG. 23, the scheduled/preventive maintenance subfunction which is identified generally by the reference numeral 170 in FIG. 23, the special project(s) subfunction identified generally by the reference numeral 172 in FIG. 23, and the spare and consumables inventory subfunction, i.e., the inventory management consumables subfunction which is identified generally by the reference numeral 176 in FIG. 23. The aforedescribed subfunctions 170, 172, 174 and 176 of the maintenance element 114 are designed to be operative so that they will identify which operations and manufacturing orders will be affected by a breakdown at a work center. In addition, the subfunctions 170, 172, 174 and 176 of the maintenance element 114 are designed to be operative so that they can also identify any preventive maintenance that is scheduled for the near future so that such preventive maintenance can be done while the work center is down. With further regard to the special project(s) subfunction 174, as best understood with reference to FIG. 23 of the drawing, the term "special project(s)" is intended to encompass the following activities: rebuild a machine identified generally by the reference numeral 178 in FIG. 23, install a new machine identified generally by the reference numeral 180 in FIG. 23 and relocate a machine identified generally by the reference numeral 182 in FIG. 23. Finally, although not depicted explicitly in FIG. 23 of the drawing, it is to be understood that in accord with the best mode embodiment of the invention the maintenance element 114 preferably also includes an electronic messaging capability and a hardcopy request logging capability for unplanned maintenance requests.

Figure 24:
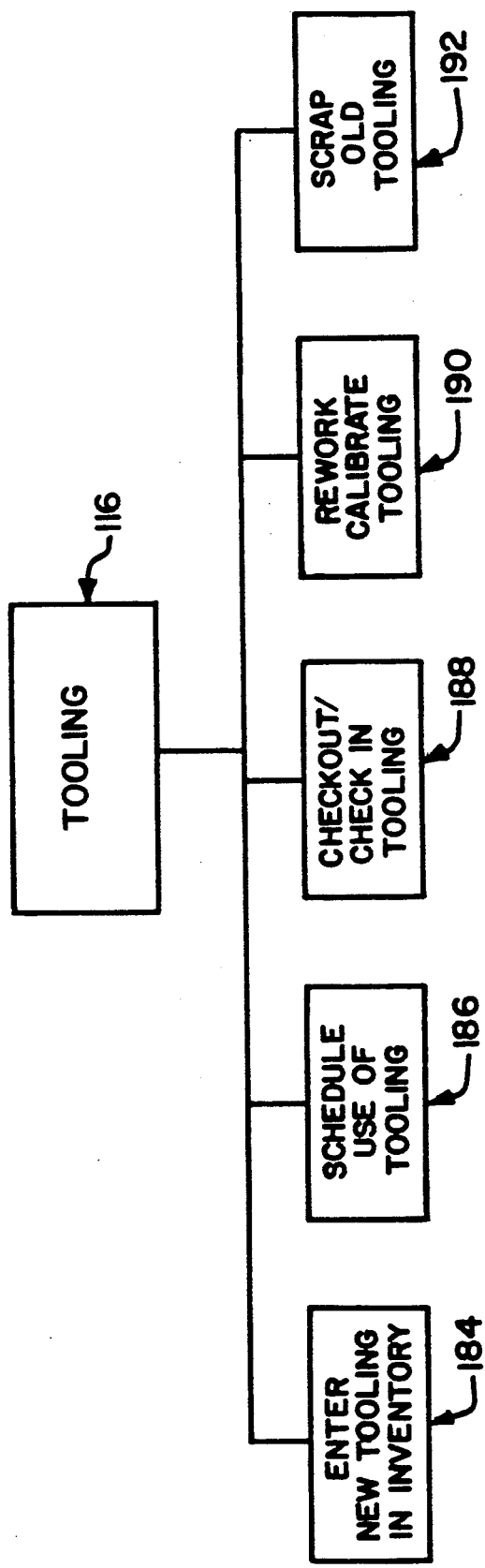
FIG. 24 is a schematic representation in block diagram form of the tooling element of the manufacture product function of the factory floor means of an integrated manufacturing system constructed in accordance with the present invention.

A discussion will next be had herein of the fourth of the five major elements that collectively comprise the manufacture product function 108 of the factory floor means 18; namely, that of the tooling element which is seen at 116 in FIG. 17 of the drawing. Reference will be had for purposes of this discussion in particular to FIG. 24 of the drawing. Thus, in accordance with the best mode embodiment of the invention and as best understood with reference to FIG. 24, the tooling element 116 includes five subfunctions. These five subfunctions are the following: the enter new tooling in inventory subfunction which is identified by the reference numeral 184 in FIG. 24, the schedule use of tooling subfunction which is identified by the reference numeral 186 in FIG. 24, the checkout/checkin of tooling subfunction which is identified by the reference numeral 188 in FIG. 24, the rework or calibrate tooling subfunction which is identified by the reference numeral 190 in FIG. 24, and the scrap old tooling subfunction which is identified by the reference numeral 192 in FIG. 24. With further regard to the tooling element 116 it is to be understood herein that in many cases individual tools will be identified by serial number. In other cases, rather than keep track of each individual tool it may be feasible to only keep track of the number of tools of a specific type.

The final one of the major elements that comprise the manufacture product function 108 of the factory floor means 18 is the quality element which is seen at 118 in FIG. 17 of the drawing. The quality element 118 in accordance with the best mode embodiment of the invention may encompass therewithin a multiplicity of different subfunctions that are tailored to fit the specific nature of the application in which it is desired to employ the integrated manufacturing system 10 of the present invention. However, regardless of the particular application in which the integrated manufacturing system 10 of the present invention is being employed there will always be included in the quality element 118 a statistical process control subfunction.

Continuing with the discussion of the five major elements, i.e., the data collection element 110, the data distribution element 112, the maintenance element 114, the tooling element 116 and the quality element 118, of the manufacture product function 108 of the factory floor means 18, each of these five major elements has associated therewith an information model. In this regard, by way of exemplification and not limitation thereof, a description will be had hereinafter of the information model for the data collection element 10, the information model for the maintenance model 114 and the information model for the tooling element 116

Figure 25:
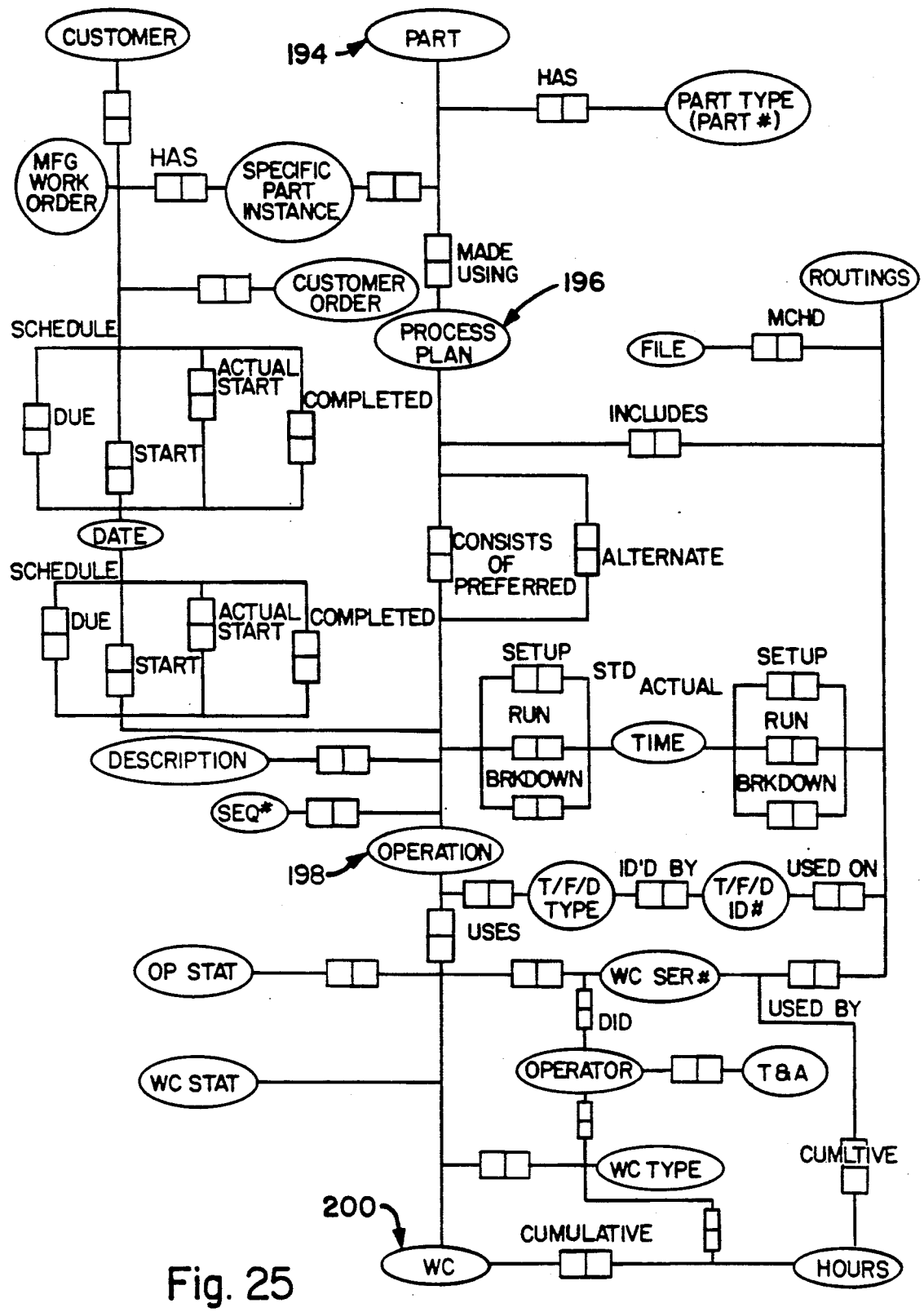
FIG. 25 is a schematic representation in block diagram form of a first portion of the information model for the data collection element of the manufacture product function of the factory floor means of an integrated manufacturing system constructed in accordance with the present invention.
Figure 26:
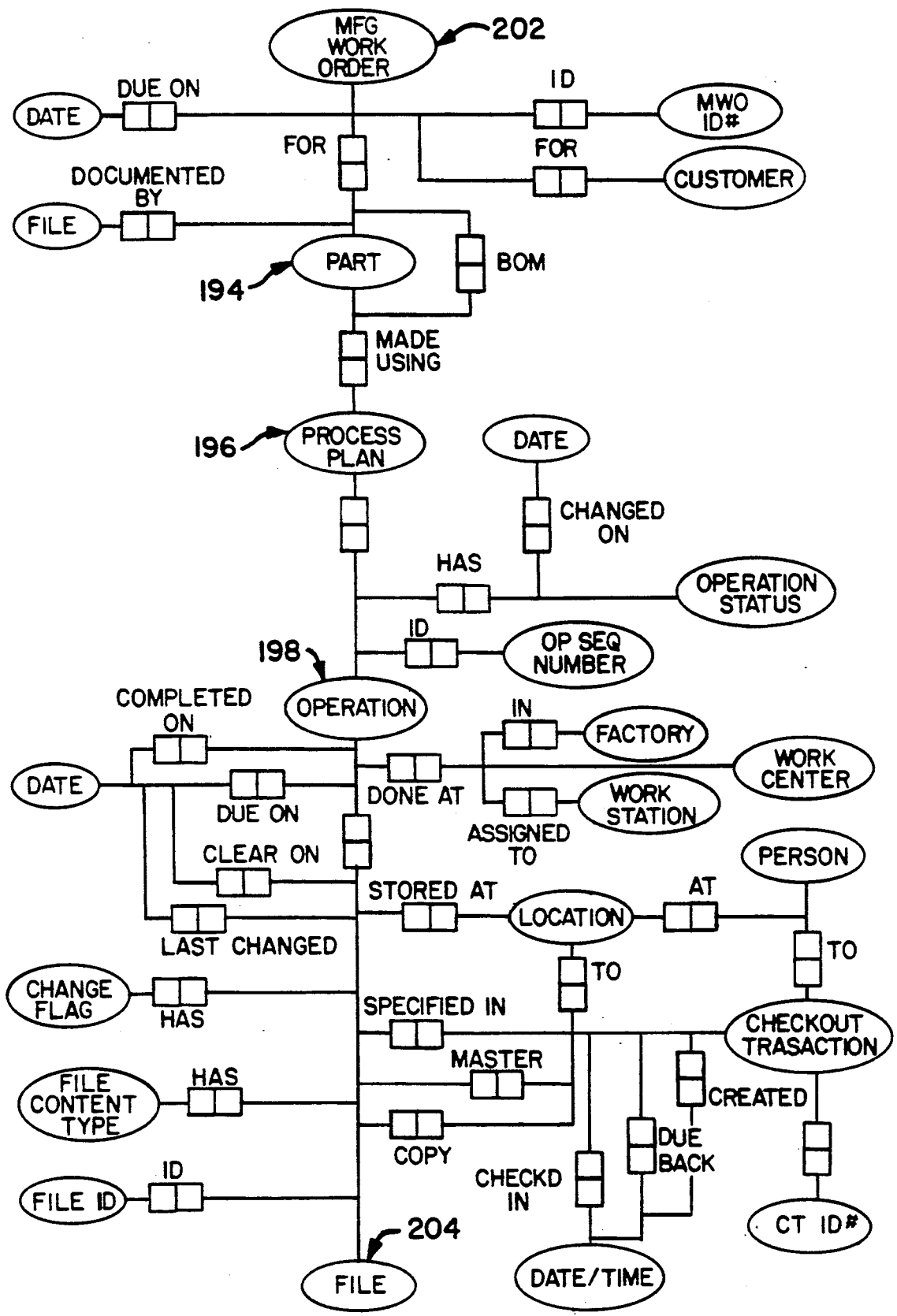
FIG. 26 is a schematic representation in block diagram form of a second portion of the information model for the data collection element of the manufacture product function of the factory floor means of an integrated manufacturing system constructed in accordance with the present invention.

Commencing, therefore, first with a description of the information model for the data collection element 110, reference will be had for this purpose in particular to FIGS. 25 and 26 of the drawing. Thus, as best understood with reference to FIG. 25 of the drawing, the four basic objects that form the backbone of the information model for the data collection element 110 are the following: part, which is identified generally in both FIGS. 25 and 26 by the reference numeral 194; process plan, which is identified generally in both FIGS. 25 and 26 by the reference numeral 196; operation, which is identified generally in both FIGS. 25 and 26 by the reference numeral 198; and work center, which is identified generally in FIG. 25 by the reference numeral 200.

Continuing herein with the description of the information model for the data collection element 110, a part 194 is made using a process plan 196, which in turn consists of operations 198. Operations 198 on the other hand are done at work centers 200. Moreover, a part 194 is identified by a particular part order. A manufacturing work order depicted generally at 202 in FIG. 26 of the drawing or shop order specifies that a part 194 is to be manufactured. The manufacturing work order 202 has an identification order and is related to a specific customer order, which is in turn related to a customer and a contract. The manufacturing work order 202 is related to date in four ways, i.e., a scheduled start and due date, and an actual start and completed date. The shop order generated by the manufacturing resource planning means 16 initially specifies the scheduled start and due dates. The actual start and completed dates are filled in later when they are known.

The process plan 196 consists of one or more operations 198. Alternate operations 198 may also be defined. The process plan 196 is identified by the number of the part 194 to which it is related. Each operation 198 is also related to date in four ways, i.e., a scheduled start and due date, and an actual start and completed date. The process plan 196 is also related to one or more routings. To this end, a process plan 196 specifies how to make a specific part 194 in general. The routing specifies and collects data for the specific part 194 for the particular manufacturing work order 202. For example, the process plan 196 specifies the standard setup and run time for an operation 198 any time the specific part 194 is made. There is a separate routing for each manufacturing work order 202 to make the part 194. This separate routing is necessary to capture data that differs for each manufacturing work order 202, such as actual setup and run times. The routing also specifies which files, depicted generally at 204 in FIG. 26, or documents are used to make the part 194. Note is taken here of the fact that file master copies are related to process plans 196, while file copies are related to specific routings.

In general, a process plan 196 may be related to many routings, i.e., one routing for each manufacturing work order 202 that specifies that part 194. A special case is when each part 194 is unique, i.e., a part 194 is only made once. In this regard, by way of exemplification and not limitation, this is usually the case with tubular products, but not with machined parts. This information model for the data collection element 110 can still handle this case by simply having only one routing for a process plan 196. The alternate approach, combining unique routing data with process planning data, creates a problem because it prohibits ever reusing a process plan 196.

Each operation 198 has a sequence number and a description. The sequence number only identifies the operation 198 within a specific process plan 196. To uniquely identify an operation 198 requires the operation sequence number, the process plan, i.e., part, number, the component number and the contract number. Each operation 198 also has a standard setup and run time. When the operation 198 is actually done, the actual setup and run time is collected and saved as part of the routing. An operation 198 also uses certain types of tooling, fixtures, and/or dies. Again, when the operation 198 is done the actual tooling, fixture, and/or die is identified preferably by serial number. This is helpful from the standpoint of both tooling inventory and maintenance. An operation 198, as related to a routing not a process plan 196, also has an operational status such as scheduled, started, in-process or completed.

Finally, an operation 198 is done at a work center 200. The work center 200 is identified by an asset number and has a work center type and status. Each work center 200 also has a cumulative number of hours, which is used for scheduling maintenance. There are operators who are qualified to run particular types of work centers 200. Also, a routing specifies the actual work center 200 used for an operation 198 and the operator who performed the operation 198.

Figure 27:
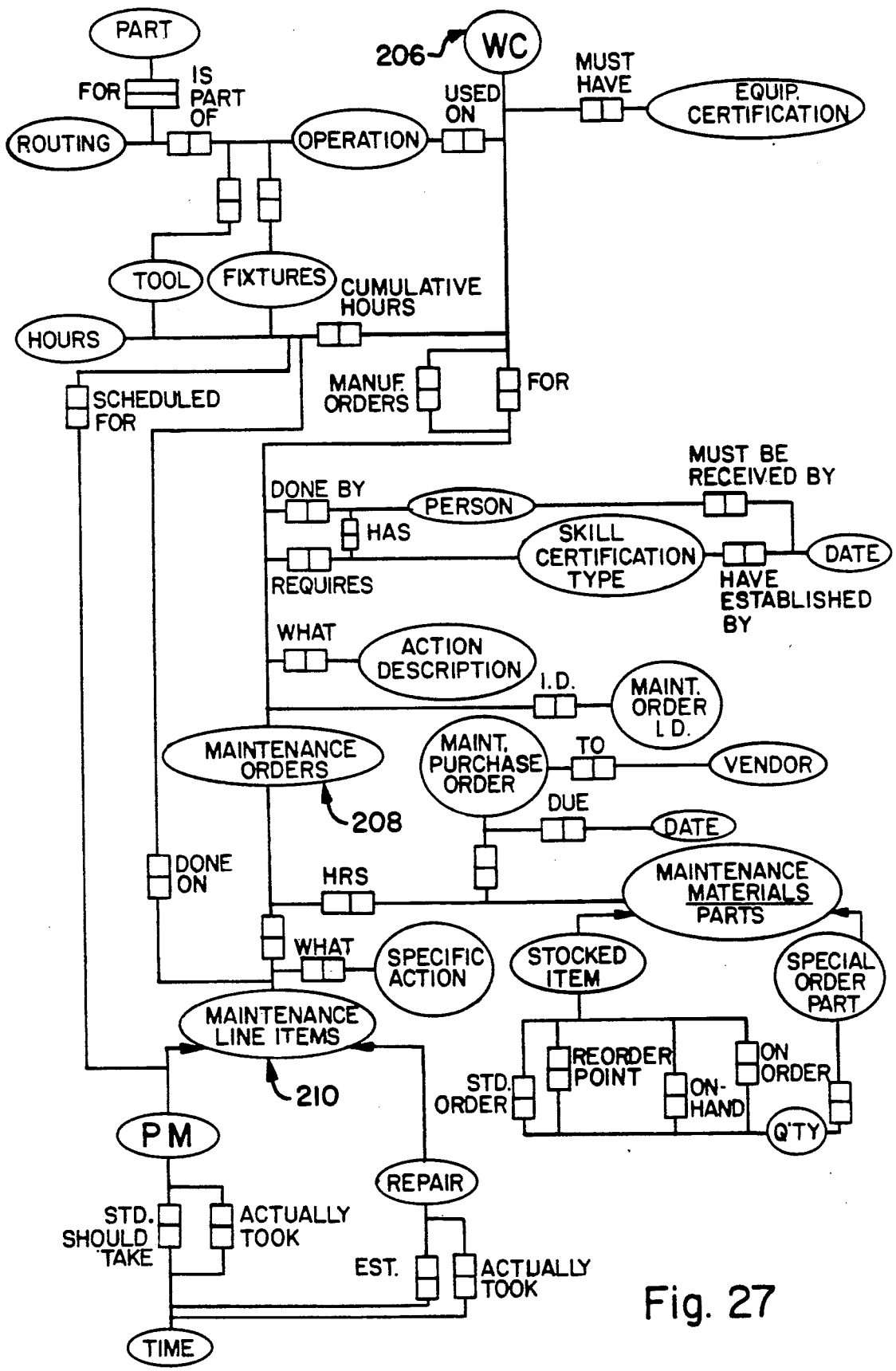
FIG. 27 is a schematic representation in block diagram form of the information model for the maintenance element of the manufacture product function of the factory floor means of an integrated manufacturing system constructed in accordance with the present invention.

Turning next to a description of the information model for the maintenance element 114, reference will be had for this purpose in particular to FIG. 27 of the drawing. Thus, as best understood with reference to FIG. 27 of the drawing, the basic structure for the maintenance element 114 information model involves work centers, denoted generally by the reference numeral 206 in FIG. 27; maintenance orders, denoted generally by the reference numeral 208 in FIG. 27; and maintenance line items, denoted generally by the reference numeral 210 in FIG. 27.

As described hereinbefore in connection with the discussion of the information model for the data collection element 110, a work center 206 is identified by an asset number, is used for an operation 198, and has a cumulative number of operating hours associated therewith. Some work centers 206 also require equipment certification. Work centers 206 are related to maintenance orders 208 in two ways. First, a maintenance order 208 is for a certain work center 206. Second, a maintenance order 208 may affect zero, one, or more other work centers 206.

Every maintenance order 208 has a maintenance order identification and a description. It may also require a skill certification. The maintenance order 208 is done by an employee, who must have the requisite skill certification. Also, the employee's skill certification must be current, if not the employee is required to become recertified.

A maintenance order 208 may also require maintenance parts, which may be either stocked or special order parts. Stocked parts have four roles relating them to quantity, i.e., quantity on-hand, quantity on-order, reorder point and standard order quantity. Special order maintenance parts have only two roles, i.e., quantity on-order and quantity on-hand. Maintenance parts and materials are ordered through a purchase order to a vendor and with a due date. Maintenance parts and materials are inventoried and tracked by the maintenance departments in each factory location, but all of the actual purchase orders may be generated through the purchasing module of the manufacturing resource planning means 16, so there must be a linkage between the maintenance element 114 and the manufacturing resource planning means 16. A second link is also needed so that the manufacturing resource planning means 16 will have information supplied thereto regarding machine down time and its impact on resource availability.

Each maintenance order 208 consists of one or more maintenance line items 210. There are two subtypes of maintenance line items 210, i.e., preventive maintenance items and repair items. Note is taken here of the fact that these are subtypes of maintenance line items 210 rather than maintenance orders 208 because a maintenance order 208 may include both types of items. For example, a maintenance order 208 generated to repair a work center 206 may also include any preventive maintenance items that would be needed in the near future. All maintenance orders 208 are described by a specific action and done at a certain time. The time the maintenance line item 210 is done is specified in two ways, i.e., a date and clock time when the maintenance line item 210 was done and the cumulative number of hours on the work center 206 when the action was taken.

A repair item has both a time estimate and the actual time it took to make the repair. A preventive maintenance item has a standard time that the work should take and an actual time that it took. Preventive maintenance items are scheduled to be done either on a certain date or when the work center 206 has accumulated a certain number of hours of operation.

Figure 28:
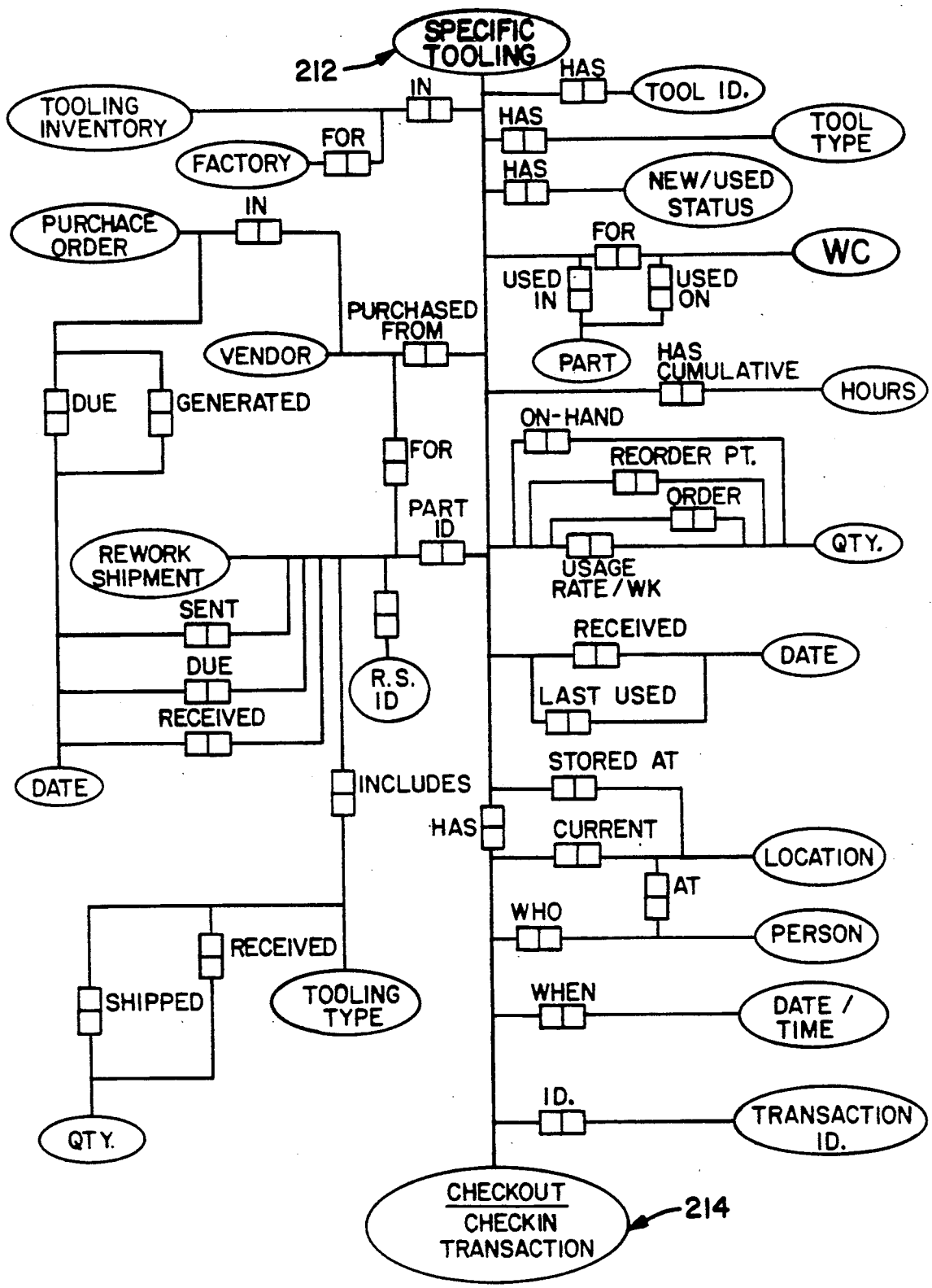
FIG. 28 is a schematic representation in block diagram form of the information model for the tooling element of the manufacture product function of the factory floor means of an integrated manufacturing system constructed in accordance with the present invention.

Finally a brief description will now be had herein of the information model for the tooling element 116. For this purpose, reference will be had in particular to FIG. 28 of the drawing. Thus, as best understood with reference to FIG. 28 the basic structure in the information model for the tooling element 116 is that a specific tool, depicted generally at 212 in FIG. 28, is specified in a checkout/checkin transaction, depicted generally at 214 in FIG. 28. In the information model as illustrated in FIG. 28 the tooling element 116 may encompass tooling, fixtures or dies. Other information which is encompassed in the information model, as shown in FIG. 28, for the tooling element 116 relates to the tooling element 116 in either of two ways. First, some information in the information model of FIG. 28 relates to a specific piece of tool, which is identified by a unique identification number, e.g., cumulative hours on a tool. Second, other information in the information model of FIG. 28 relates only to a certain type of tooling, not to a specific piece of tooling, e.g., quantity on-hand or a checkout/checkin transaction 214.

Continuing with the description of the information model as depicted in FIG. 28 for the tooling element 116, one needs first to consider the information related to a unique piece of tooling. Each piece of tooling has an identification number, a tool type, a new/used status, and has a location specified in a tooling inventory in a given factory location. The integrated manufacturing system 10 constructed in accordance with the present invention can also keep track of the cumulative number of hours a tool has been used. Further, a specific piece of tooling also has a date on which it was received and a date on which it was last used.

Secondly, one needs to take note of the fact that other types of information, which are contained in the information model as depicted in FIG. 28 for the tooling element 116, are related to types of tooling, not to individual pieces of tooling. In this regard, a tool can be used on certain work centers and to make certain types of parts. Further, all tools have associated therewith a quantity on-hand amount and a usage rate per month. Tool that is ordered has several additional quantities, i.e., a reorder point, an order quantity and a quantity on-order amount. There can also be purchase orders to vendors for purchased tooling. Each of these purchase orders has a generated date and a due date. Note is also taken here of the fact that some types of tooling and materials, especially consumables, e.g., welding rods, are not tracked by serial number, only by the amount used.

A checkout/checkin transaction 214 is used to track the location and usage of individual pieces of tooling. A tooling checkout transaction has an identification number and specifies the date and time, the person checking out the tooling, the identification number of the tooling being checked out, and the location where the tooling will be used. There may also be found to be a need to relate the tooling to the manufacturing work order 202 and/or the operation 198. Also, the information model as depicted in FIG. 28 for the tooling element 116 assumes that a checkout transaction only relates to a single piece of tooling. Namely, the current information model as depicted in FIG. 28 for the tooling element 116 assumes that a single transaction cannot check out more than one piece of tooling.

Continuing with the description of the information model as depicted in FIG. 28 for the tooling element 116, as tooling is used it becomes worn and eventually needs to be repaired or reworked. To this end, the tooling may be reworked internally or sent out to a vendor as part of a rework shipment. Moreover, if the tooling is being reworked internally, it may simply be checked out for rework without needing an additional information structure. A specific piece of tooling which is included in a rework shipment has associated therewith an identification number, the fact that it has been sent to a vendor, the fact that it was sent out on a particular date and the fact that it is due back on a particular date. The shipment of tooling sent out for reworking is later returned on a date. As a summary, each rework shipment may include tooling of different types and for each type of tooling there is a quantity shipped and a quantity returned, the two of which may be different because some of the pieces of tooling sent out for reworking may not be repairable.

Thus, in accordance with the present invention there has been provided a new and improved integrated system suitable for use for managing the distribution to a factory floor and throughout a factory of information required for the manufacture of products. Moreover, the integrated manufacturing system of the present invention is characterized in that the information distributed to the factory floor and throughout the factory is that information in the form of design and manufacturing data which is necessary for the production of products on the factory floor. In addition, in accord with the present invention an integrated manufacturing system is provided which is characterized in that it encompasses a central repository for all shared information wherein is stored the information that is distributed to the factory floor and throughout the factory. Further, the integrated manufacturing system of the present invention is characterized in that it encompasses an engineering enterprise wherein the design information pertaining to the production of the product which is distributed to the factory floor and throughout the factory is generated. Additionally, in accordance with the present invention an integrated manufacturing system is provided which is characterized in that it encompasses a manufacturing resource planning system wherein the scheduling information pertaining to the flow throughout the factory of materials culminating in the production of the finished product which is distributed to the factory floor and throughout the factory is generated. Also, the integrated manufacturing system of the present invention is characterized in that it is capable of being used in a new factory building. Furthermore, in accord with the present invention an integrated manufacturing system is provided which is characterized in that it is capable of being retrofitted into an existing factory building.

While only one embodiment of our invention has been shown, it will be appreciated that modifications thereof, some of which have been alluded to hereinabove, may still be readily made thereto by those skilled in the art. We, therefore, intend by the appended claims to cover the modifications alluded to herein as well as all the other modifications, which fall within the true spirit and scope of our invention.

What is claimed is:

1. An integrated manufacturing system for managing the distribution to a factory floor as well as throughout a factory of the information that is necessary to effectuate the production of products on the factory floor comprising:

a. product information entry means operative for generating from a specification furnished by a customer regarding products to be manufactured information required for purposes of effectuating the manufacture of products on the factory floor, said information generated by said product information entry means including information of a design/drawing nature, information of a process planning nature, information of a bill of materials nature and information of an estimated cost nature;

b. configuration management means connected in operative relation to said product information means said configuration management means being a central repository for all of the shared information required for purposes of effectuating the manufacture of products on the factory floor, said shared information for which said configuration management means is a central repository including information of an engineering/manufacturing control change nature, information of an overall facility information control nature and information of a product description nature;

c. manufacturing resource planning means connected in operative relation to said configuration management means and therethrough to said product information entry means, said manufacturing resource planning means being the source of information of a scheduling nature required for purposes of effectuating the manufacture of products on the factory floor, said information for which said manufacturing resource planning means is a source including information of a purchase order/work order nature and information of an inventory control nature; and d. factory floor means connected in operative relation to said manufacturing resource planning means and therethrough to both said configuration management means and said product information entry means, said factory floor means being the source of information relating to the operations that take place on the factory floor during the course of effectuating thereat the manufacture of products, said information for which said factory floor means is a source including information of a work center load nature, information of a manufacturing method nature, information of a data collection nature, information of a direct numerical control nature and information of a tooling/fixturing status nature.

2. The integrated manufacturing system as set forth in claim 1 further including other design/manufacturing information source means.

3. The integrated manufacturing system as set forth in claim 2 wherein said other design/manufacturing information source means is an additional source of design information.

4. The integrated manufacturing system as set forth in claim 3 wherein said other design/manufacturing information source means is an additional source of manufacturing information.

* * * * *